US011425271B2

(12) United States Patent
Mikoshiba

(10) Patent No.: US 11,425,271 B2
(45) Date of Patent: Aug. 23, 2022

(54) PROCESS CONDITION SETTING SYSTEM, PROCESS CONDITION SETTING METHOD, AND PROGRAM

(71) Applicant: KONICA MINOLTA, INC., Tokyo (JP)

(72) Inventor: Yusuke Mikoshiba, Toyokawa (JP)

(73) Assignee: Konica Minolta, Inc., Tokyo (JP)

(*) Notice: Subject to any disclaimer, the term of this patent is extended or adjusted under 35 U.S.C. 154(b) by 49 days.

(21) Appl. No.: 16/999,331

(22) Filed: Aug. 21, 2020

(65) Prior Publication Data

US 2021/0092242 A1 Mar. 25, 2021

(30) Foreign Application Priority Data

Sep. 24, 2019 (JP) .............................. JP2019-172702
Feb. 13, 2020 (JP) .............................. JP2020-022166

(51) Int. Cl.
*H04N 1/08* (2006.01)
*H04N 1/00* (2006.01)
*G06F 3/16* (2006.01)
*G10L 15/22* (2006.01)

(52) U.S. Cl.
CPC ......... *H04N 1/00403* (2013.01); *G06F 3/167* (2013.01); *G10L 15/22* (2013.01); *H04N 1/00395* (2013.01); *H04N 1/00811* (2013.01)

(58) Field of Classification Search
CPC ....................... H04N 1/00403; H04N 1/00395
See application file for complete search history.

(56) References Cited

U.S. PATENT DOCUMENTS

2019/0349488 A1* 11/2019 Chitpasong ........ H04N 1/00403
2019/0349489 A1* 11/2019 Inagaki ................. G06F 3/1204

FOREIGN PATENT DOCUMENTS

JP 2006330576 A 12/2006

\* cited by examiner

*Primary Examiner* — Ibrahim Siddo
(74) *Attorney, Agent, or Firm* — Buchanan Ingersoll & Rooney PC

(57) ABSTRACT

An object of the present invention is to suppress occurrence of a combination inhibition error when an instruction of changing setting values of a plurality of setting items is given by a voice operation. An image processing device according to one aspect of the present invention has: an instruction receiving unit receiving a change instruction by a voice operation, for set setting values of a plurality of setting items; a setting order control unit, in the case where combination inhibition occurs by changing the set setting values of the plurality of setting items in a setting order based on the change instruction, changing the setting order of changing the set setting values to a setting order in which the combination inhibition does not occur; and a setting changing unit changing the set setting values of the plurality of setting items in the changed setting order.

13 Claims, 23 Drawing Sheets

↺ SCAN
🎤 SET TRANSMISSION DESTINATION OF SCAN

DESTINATION 1
◯ SELECT TRANSMISSION DESTINATION

DESTINATION 2
◯ SELECT TRANSMISSION DESTINATION

🎨 COLOR | 1 DOUBLE SIDES | ▦ RESOLUTION | 📄 FORMAT | 📐 ORIGINAL SIZE

| ✓ AUTOMATIC COLOR BLACK | ✓ ONE SIDE DOUBLE SIDES | ✓ 200dpi 300dpi 400dpi 600dpi | COMPACT PDF ✓ PDF JPEG TIFF | ✓ AUTOMATIC A3 A4 |

REGISTER/CHANGE USUAL SETTING

FIG. 5A

[FIRST COMBINATION INHIBITION DETERMINING PROCESS]

| FIRST CONDITION | "COMPACT PDF" IS SET IN ANY OF THE FOLLOWINGS.<br>(a) SETTING ITEM OF SETTING ON SCREEN OF OPERATION DISPLAY UNIT<br>(b) SETTING ITEM OF "USUAL SETTING"<br>READ ON THE BASIS OF VOICE OPERATION |
|---|---|
| SECOND CONDITION | BOTH OF THE FOLLOWING SETTING CONTENTS ARE INCLUDED IN CHANGE INSTRUCTION BY VOICE OPERATION<br>(c) COLOR: "BLACK"<br>(d) FILE FORMAT: "PDF" OR "TIFF" |

FIG. 5B

| PROCESS | WHEN BOTH FIRST AND SECOND CONDITIONS ARE SATISFIED, PRIORITY SET IN SETTING ITEM IS CHANGED.<br>WHEN BOTH FIRST AND SECOND CONDITIONS ARE NOT SATISFIED, WHTHER THIRD OR FOURTH CONDITION IS SATISFIED OR NOT IS DETERMINED. |
|---|---|

FIG. 6A

[SECOND COMBINATION INHIBITION DETERMINING PROCESS]

| THIRD CONDITION | "COMPACT PDF" IS SET IN ANY OF THE FOLLOWINGS.<br>(a) SETTING ITEM OF SETTING ON SCREEN OF OPERATION DISPLAY UNIT<br>(b) SETTING ITEM OF "USUAL SETTING"<br>READ ON THE BASIS OF VOICE OPERATION |
|---|---|
| FOURTH CONDITION | BOTH OF THE FOLLOWING SETTING CONTENTS ARE INCLUDED IN CHANGE INSTRUCTION BY VOICE OPERATION<br>(e) RESOLUTION: "400 dpi" OR "600 dpi"<br>(f) FILE FORMAT: OTHER THAN "COMPACT PDF" OR "JPEG" |

FIG. 6B

| PROCESS | WHEN BOTH THIRD AND FOURTH CONDITIONS ARE SATISFIED, PRIORITY SET IN SETTING ITEM IS CHANGED.<br>WHEN BOTH THIRD AND FOURTH CONDITIONS ARE NOT SATISFIED, PRIORITY CHANGE PROCESS IS NOT EXECUTED. |
|---|---|

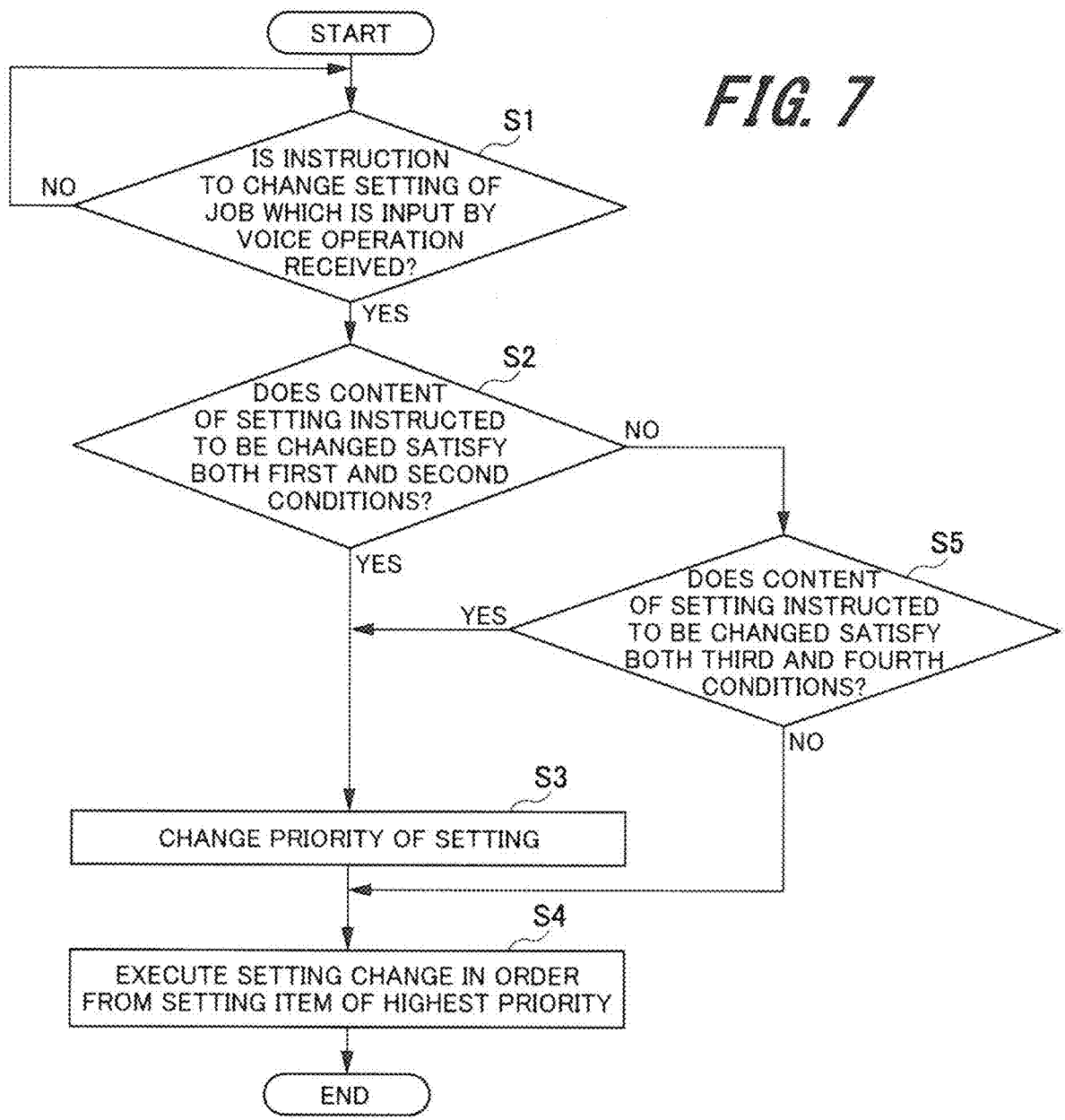

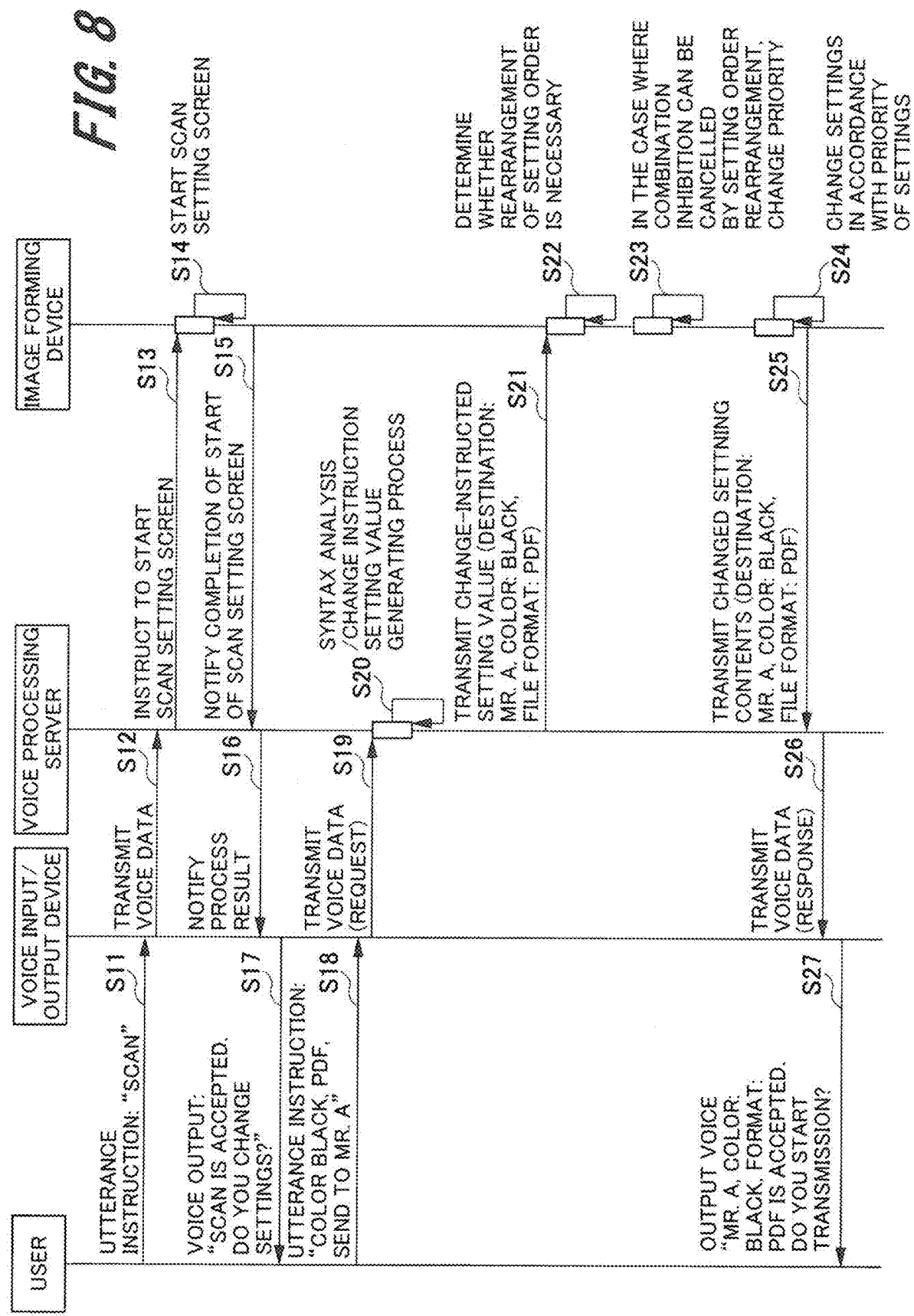

| PATTERN | SETTING ORDER | SETTING RESULTS | THE NUMBER OF VALID SETTING CHANGES |
|---|---|---|---|
| 1 | 1, 2, 3 | 1:×, 2:×, 3:○ | 1 |
| 2 | 1, 3, 2 | 1:×, 2:○, 3:○ | 2 |
| 3 | 2, 1, 3 | 1:×, 2:×, 3:○ | 1 |
| 4 | 2, 3, 1 | 1:×, 2:○, 3:○ | 2 |
| 5 | 3, 2, 1 | 1:○, 2:○, 3:○ | 3 |
| 6 | 3, 1, 2 | 1:○, 2:○, 3:○ | 3 |

FIG. 20

| COMBINATION INHIBITION OCCURRENCE CONDITION | SETTING INHIBITED TO BE COMBINED | COMBINATION INHIBITION CANCELLATION CONDITION |
|---|---|---|
| FILE FORMAT: COMPACT PDF | COLOR: BLACK RESOLUTION: 600 dpi | FILE FORMAT: PDF |
| COLOR: BLACK | FILE FORMAT: COMPACT PDF | FILE FORMAT: PDF |
| RESOLUTION: 600 dpi | FILE FORMAT: COMPACT PDF | FILE FORMAT: PDF |
| ⋮ | ⋮ | ⋮ |

| PATTERN | SETTING ORDER | SETTING RESULT | THE NUMBER OF VALID SETTING CHANGES |
|---|---|---|---|
| 1 | 3, 1 | 3:○, 1:○ | 2 |
| 2 | 1, 3 | 1:×, 3:○ | 1 |

SCAN SETTING

DESTINATION: MR. B

COLOR: BLACK

RESOLUTION: 300 dpi

FILE FORMAT: PDF

RETURN    START

FIG. 27

| SETTING ITEM | PRIORITY |
|---|---|
| COLOR | 3 |
| RESOLUTION | 2 |
| FILE FORMAT | 1 |

SCAN SETTING

DESTINATION: NONE

COLOR: SETTING VALUE v1

RESOLUTION: SETTING VALUE v2

FILE FORMAT: SETTING VALUE v3

[RETURN]  [START]

FIG. 29

| PATTERN | SETTING ORDER | SETTING RESULT | THE NUMBE OF VALID SETTING CHANGES | TOTAL VALUE OF PRIORITY |
|---|---|---|---|---|
| 1 | 1, 2, 3 | 1:×, 2:×, 3:○ | 1 | 1 |
| 2 | 1, 3, 2 | 1:×, 3:○, 2:○ | 2 | 3 |
| 3 | 2, 1, 3 | 2:×, 1:×, 3:○ | 1 | 1 |
| 4 | 2, 3, 1 | 2:×, 3:○, 1:○ | 2 | 4 |
| 5 | 3, 2, 1 | 3:○, 2:×, 1:× | 1 | 1 |
| 6 | 3, 1, 2 | 3:×, 1:○, 2:○ | 2 | 5 |

PROCESS CONDITION SETTING SYSTEM, PROCESS CONDITION SETTING METHOD, AND PROGRAM

CROSS-REFERENCE TO RELATED APPLICATIONS

The entire disclosure of Japanese Patent Application No. 2020-22166, filed on Feb. 13, 2020, is incorporated herein by reference in its entirety.

BACKGROUND

Technological Field

The present invention relates to a process condition setting system, a process condition setting method, and a program.

There is conventionally an image forming device which can perform an operation by voice input (hereinbelow, also called "voice operation"). For example, Patent Literature 1 discloses an image forming device having voice input means inputting voice, voice recognition means recognizing voice inputted by the voice input means by using limited dictionary data and generating recognition data as a result of the recognition, and command generation means generating a command for executing an operation indicated by the recognition data, and an information processing device connected to the image forming device.

CITATION LIST

Patent Literature

Patent Literature 1: Japanese Unexamined Patent Application Publication No. 2006-330576

SUMMARY

There is an image forming device capable of performing a voice operation, which can make a setting regarding a job (process) of the image forming device by a voice operation. Since there are a plurality of items to be set in a setting regarding a job, in the case of setting a plurality of setting items individually, the user has to input a setting content by voice each time. For example, settings for a job of copy include "the number of copies", "color", "double sides", "page aggregation", and the like. When it is necessary to set those things one by one, the user has to repeat the operation instruction by utterance. Therefore, provision of a function capable of setting or changing a plurality of setting items by one voice input is desired.

However, for example, when the user instructs a change of setting values of a plurality of setting items by one voice input, there is the possibility that a setting after the change based on the instruction becomes a setting which is inhibited to be set by being combined (hereinbelow, also called "combination inhibition") in the image forming device.

For example, a case in which the following settings (1) to (5) are made as settings of a job of scan is assumed.
(1) color: automatic
(2) double sides: one side
(3) resolution: 200 dpi
(4) format: compact PDF (Portable Document Format)
(5) original size: automatic It is assumed that "black" of "color" and "compact PDF" of "file format" are set to combination inhibition.

When a change of the setting is instructed by a voice operation by the user, it is assumed that a change of setting values of the setting items is executed by control of the following (A) to (C).
(A) The setting values of the setting items are changed in the order of (1) to (5).
(B) When combination inhibition occurs due to the change of the setting values of the setting items, the change is not executed in the setting in which the combination inhibition occurs but the setting value of the setting item in the order of the next highest priority (hereinafter, called "priority order") is changed.
(C) On completion of the change of the setting values of all of setting items, information of the combination inhibition occurred is notified to the user.

It is assumed that, in a state where the settings (1) to (5) are made, a change of the settings is instructed by utterance of "change to color black and PDF" by the user. In this case, when the change is made in accordance with the order of setting changes which are preliminarily set, first, "color" of "1" is changed from "automatic" to "black". At this time point, combination inhibition occurs between "black" of "color" after the change and "compact PDF" before the change of "file format". In this case, based on the control (B), the change of "color" from "automatic" to "black" is not executed.

Combination inhibition does not occur between "PDF" of "file format" and "black" of "color" in the instruction of the change. However, in the case where the above-described controls (A) to (C) are performed, the change as desired by the user is not executed.

The present invention has been made in consideration of such a situation. An object of the present invention is to suppress occurrence of inhibited combination in the case where an instruction to change setting values of a plurality of items is given by utterance of the user.

To solve at least one of the problems, according to an aspect of the present invention, a process condition setting system in which one aspect of the present invention is reflected has an instruction receiving unit, a setting order control unit, and a setting changing unit. The instruction receiving unit receives a change instruction by a voice operation to setting values which are set, of a plurality of setting items. In the case where inhibition of combination occurs between a change-instructed setting value included in the change instruction and the set setting value, the setting order control unit changes the set setting values of the plurality of setting items in a setting order based on the change instruction, thereby changing the setting order of changing the set setting values to a setting order which does not cause combination inhibition. The setting changing unit changes the set setting values of the plurality of setting items in the changed setting order.

BRIEF DESCRIPTION OF THE DRAWINGS

The advantages and features provided by embodiments of the invention will become more fully understood from the detailed description given hereinbelow and the appended drawings which are given by way of illustration only, and thus are not intended as a definition of limits of the present invention:

FIG. 4 is a diagram illustrating a display example of setting items related to a job of scanning and an example of priority of a setting change which is set in each of the setting items according to the first embodiment of the present invention;

FIGS. 5A and 5B are tables illustrating an example of conditions which are referred to by a combination inhibition determining unit at the time of a first combination inhibition determining process and an example of a process executed by a setting order control unit according to the first embodiment of the present invention;

FIGS. 6A and 6B are tables illustrating an example of conditions which are referred to by the combination inhibition determining unit at the time of a second combination inhibition determining process and an example of a process executed by the setting order control unit according to the first embodiment of the present invention;

FIG. 7 is a flowchart illustrating an example of the procedure of a combination inhibition determining process by the combination inhibition determining unit and a priority changing process by the setting order control unit according to the first embodiment of the present invention;

FIG. 8 is a sequence chart illustrating an example of the procedure of a process condition setting process by the image processing system according to the first embodiment of the present invention;

FIG. 20 is a diagram illustrating a configuration example of a combination inhibition setting table according to a third embodiment of the present invention;

FIG. 23 is a diagram illustrating an example of a setting change result by a setting order control unit according to the third embodiment of the present invention;

FIG. 24 is a diagram illustrating an example of a scan setting confirmation screen displayed in the operation display unit of the image forming device according to the third embodiment of the invention;

FIG. 27 is a diagram illustrating a configuration example of a priority management table according to a modification of the third embodiment of the present invention;

FIG. 28 is a diagram illustrating an example of a scan setting confirmation screen displayed in an operation display unit of an image forming device according to the modification of the third embodiment of the present invention;

FIG. 29 is a diagram illustrating an example of a setting change result by a setting order control unit according to the modification of the third embodiment of the present invention;

DETAILED DESCRIPTION OF EMBODIMENTS

Figure 1:
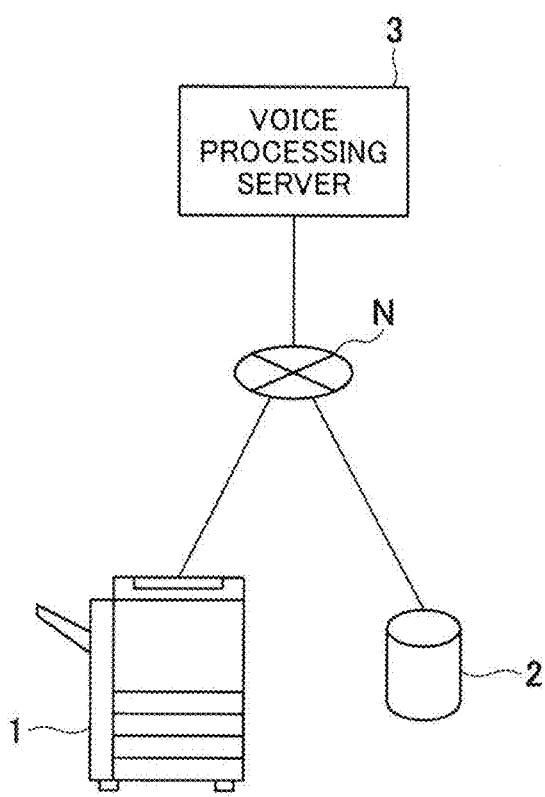
FIG. 1 is a schematic configuration diagram of an image processing system according to a first embodiment of the present invention.

Hereinafter, embodiments for carrying out the present invention will be described in detail with reference to the appended drawings. However, the scope of the invention is not limited to the embodiments. The same reference numerals are designated to components having substantially the same functions or configurations in the specification and the drawings, and repetitive explanation will not be given.

First Embodiment

Configuration of Image Processing System

First, referring to FIG. 1, the configuration of an image processing system according to a first embodiment of the present invention will be described. FIG. 1 is a schematic configuration diagram of an image processing system 100 according to a first embodiment of the present invention.

The image processing system 100 illustrated in FIG. 1 has an image forming device 1 (an example of a process condition setting system), a voice input/output device 2, and a voice processing server 3. The voice input/output device 2 and the voice processing server 3 are connected, and the voice processing server 3 and the image forming device 1 are connected via a network N made by a public switched telephone network, an IP (Internet Protocol) network, or the like.

The image forming device 1 is configured by, for example, an MFP (Multi-Functional Peripherals) having a copy function, a printer function, a scanner function, and the like. The image forming device 1 forms an image on a paper sheet on the basis of image data transmitted from a not-illustrated terminal device or the like and outputs the sheet on which the image is formed as a printed sheet.

The voice input/output device 2 is configured by, for example, a smart speaker and has a microphone and a speaker which are not illustrated. The voice input/output device 2 converts voice collected by the microphone, for example, an operation instruction uttered by the user to voice data and transmits the voice information to the voice processing server 3. The voice input/output device 2 reproduces the voice information transmitted from the voice processing server 3 and emits the sound from the speaker.

The voice processing server 3 is provided, for example, in not-illustrated cloud and its function is provided as cloud application service. The voice processing server 3 performs a voice analyzing process on the voice information transmitted from the voice input/output device 2. The voice processing server 3 transmits an instruction for the image forming device 1 corresponding to the result of the voice analyzing process to the image forming device 1.

Although the example that the voice processing server 3 is provided in cloud is described in the embodiment, the present invention is not limited to the example. The voice processing server 3 may be provided in the image forming device 1 or a not-illustrated on-premise server or the like. Between the voice processing server 3 and the image forming device 1, a relay server or the like performing a process of receiving voice information on a job from the voice processing server 3, storing it, and passing the job to the image forming device 1 may be provided.

Figure 2:
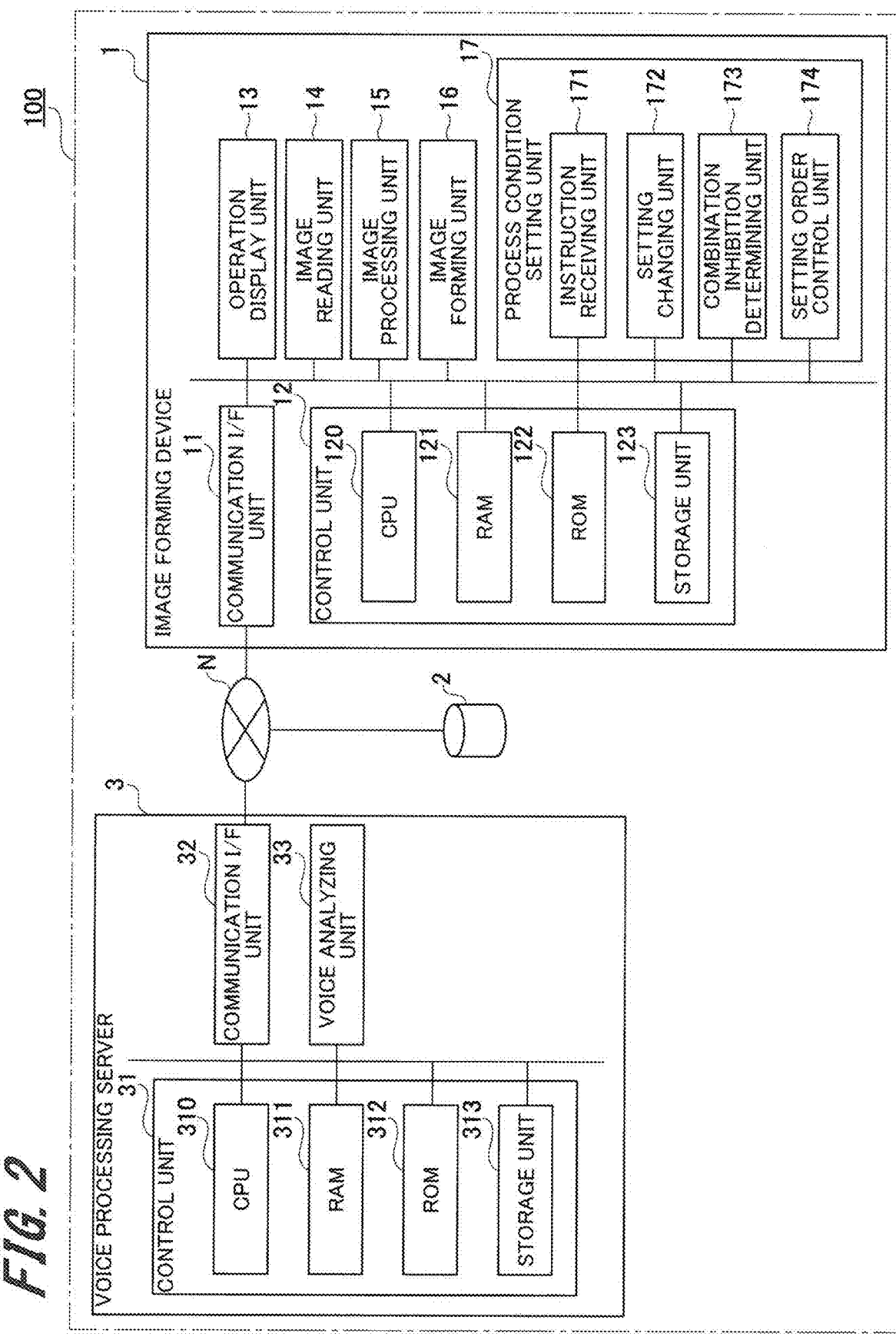
FIG. 2 is a block diagram illustrating a construction example of a control system of an image forming device and a voice processing server according to the first embodiment of the present invention.

Configuration of Control System of Image Forming Device and Voice Processing Server Next, with reference to FIG. 2, the configuration of the control system of the image forming device 1 and the voice processing server 3 will be described. FIG. 2 is a block diagram illustrating a construction example of the control system of the image forming device 1 and the voice processing server 3.

Configuration of Control System of Image Forming Device

First, the configuration of the control system of the image forming device 1 will be described. As illustrated in FIG. 2, the image forming device 1 includes a communication I/F (Interface) unit 11, a control unit 12, an operation display unit 13, an image reading unit 14, an image processing unit 15, an image forming unit 16, and a process condition setting unit 17.

The communication I/F unit 11 controls operations of transmitting/receiving various data to/from the voice processing server 3 connected via the network N.

The control unit 12 includes a CPU (Central Processing Unit) 120, a RAM (Random Access Memory) 121, a ROM (Read Only Memory) 122, and a storage unit 123.

The CPU 120 reads various process programs such as a system program, an image formation processing program, and a process condition setting program stored in the ROM 122, loading them in the RAM 121, and controls the operations of the units in the image forming device 1 in accordance with the loaded programs. For example, the CPU 120 performs a control of making the units constructing the image forming device 1 execute various processes associated with instructions which are input from the voice processing server 3.

The RAM 121 temporarily stores data necessary for the CPU 120 to execute the programs, image data (scan image data, print image data, and finish preview image data), and the like.

The ROM 122 is configured by a nonvolatile memory such as a semiconductor memory and stores a system program adapted to the image forming device 1 and various programs which can be executed on the system program. The programs stored in the ROM 122 are formed in the form of program codes which can be read by the computer, and the CPU 120 sequentially executes the operations according to the program codes.

The storage unit 123 is configured by an HDD (Hard Disk Drive), an SSD (Solid State Drive) or the like and stores various setting data, image data, and the like related to the image forming device 1.

The operation display unit 13 is configured, for example, as a touch panel in which a display unit made by an LCD (Liquid Crystal Display), an organic EL (Electroluminescence) or the like and an operation input unit made by a touch sensor or the like are integrally formed. In the display unit of the operation display unit 13, for example, a setting screen for performing settings related to various jobs such as copying, scanning, printing, and the like is displayed.

Although the example that the display unit and the operation input unit are integrally formed as the operation display unit 13 has been described in the embodiment, the present invention is not limited to the example. The display unit and the operation input unit made by a keyboard, a mouse, or the like may be configured separately. A configuration that the operation input unit made by a keyboard, a mouse, or the like is provided in addition to the operation display unit 13 configured as a touch panel may also be employed.

The image reading unit 14 optically reads image data from an original which is put on a not-illustrated original placing table. The image reading unit 14 includes CCD (Charge Coupled Devices) and a scan control unit for controlling scanning by the CCD (which are not illustrated). The CCD receives light reflected from an original irradiated with light from a not-illustrated light source and converts the light to an electric signal. The scanning control unit performs control of the operation of the CCD, a process of an electric signal output from the CCD, and the like.

The image processing unit 15 performs various image processes such as color adjustment, density adjustment, contrast adjustment, color combination conversion, size adjustment of an image, and adjustment of character width in an image on image data transmitted from a not-illustrated terminal device.

The image forming unit 16 forms an image on a paper sheet on the basis of image data subjected to the image process in the image processing unit 15 and outputs the sheet on which the image is formed as a printed sheet. The image forming unit 16 has a charging device, a photoconductive drum, an exposure device, a transfer belt, and a fixing device which are not illustrated.

First, the image forming unit 16 forms an electrostatic latent image on the peripheral face of the photoconductive drum by irradiating the photoconductive drum charged by the charging device with light according to an image from the exposure device. Subsequently, by supplying toner from a developing device to a photoconductive member, the image forming unit 16 makes the toner adhered onto the charged electrostatic latent image to develop a toner image. After that, the image forming unit 16 performs primary transfer of the toner image onto the transfer belt and secondary transfer of the toner image transferred to the transfer belt to a sheet and, further, allows the fixing device make the toner image transferred to the sheet fixed on the paper sheet.

Although the example that the image forming unit 16 performs image formation by using the electrophotographic method has been described in the embodiment, the present invention is not limited to the example. In the image processing system and the image forming device of the present invention, an image forming unit performing image formation by another method such as the ink jet method may also be used.

The process condition setting unit 17 performs settings related to various jobs such as copying, scanning, and printing on the basis of an instruction received from the voice processing server 3 via the communication I/F unit 11 and changes the settings. The process condition setting unit 17 includes an instruction receiving unit 171, a setting changing unit 172, a combination inhibition determining unit 173, and a setting order control unit 174.

The instruction receiving unit 171 receives an instruction corresponding to the content of the utterance of the user received from the voice processing server 3 via the communication I/F unit 11. In response to the instruction received by the instruction receiving unit 171, the setting changing unit 172 changes the setting values of the setting items displayed in the screen of the operation display unit 13 one by one on the basis of the priority of the setting change which is set in the display order of the setting items in the screen of the operation display unit 13. The priority which is set in each of the setting items will be described in detail later with reference to FIGS. 3 and 4.

The combination inhibition determining unit 173 determines, when a setting value of a setting item is changed on the basis of an instruction made by the voice operation received by the instruction receiving unit 171, whether or not combination inhibition occurs between the setting item and its setting value (an example of a change-instructed setting value) instructed to be changed by the voice operation and a setting item and its setting value presently set (an example of a set setting value). The combination inhibition determining unit 173 performs, first, a first combination inhibition determining process and, in the case where it becomes necessary as a result of the first combination inhibition determining process, performs a second combination inhibition determining process. The first and second combination inhibition determining processes will be described in detail with reference to FIGS. 5 and 6 later.

In the case where the combination inhibition determining unit 173 determines that combination inhibition occurs and that the occurrence of combination inhibition can be prevented by changing the priority of change which is set in each of the setting items and executing the change, the setting order control unit 174 changes the priority which is set in the setting items.

Configuration of Control System of Voice Processing Server

Next, referring again to FIG. 2, the configuration of the control system of the voice processing server 3 will be described. As illustrated in FIG. 2, the voice processing server 3 includes a control unit 31, a communication I/F unit 32, and a voice analyzing unit 33.

The control unit 31 includes a CPU 310, a RAM 311, a ROM 312, and a storage unit 313.

The CPU 310 reads any of various processing programs such as a system program, a voice processing program, and a process condition setting program stored in the ROM 312, loads it into the RAM 311, and controls the operation of each of the units of the voice processing server 3 in accordance with the loaded program.

For example, when voice information is transmitted from the voice input/output device 2, the CPU 310 performs a control of transmitting any of various instructions related to a job of an image process corresponding to the voice information to the image forming device 1 via the communication I/F unit 32.

The RAM 311 forms a work area for temporarily storing the various programs to be executed by the CPU 310 and data related to the programs.

The ROM 312 is formed by a nonvolatile memory such as a semiconductor memory or the like and stores a system program corresponding to the voice processing server 3, a voice processing program which can be executed on the system program, and the like. Those programs are stored in the form of a program code which can be read by a computer, and the CPU 310 sequentially executes an operation according to the program code.

The storage unit 313 is configured by an HDD, an SSD, or the like and stores various setting data related to the voice processing server 3, an instruction related to a job of an image process associated with a result of voice analysis by the voice analyzing unit 33, and the like.

The communication I/F unit 32 controls operations of transmitting/receiving various data to/from the voice input/output device 2 connected via the network N.

The voice analyzing unit 33 analyzes voice information transmitted from the voice input/output device 2, reads an instruction corresponding to the voice analysis result, for example, a start instruction of setting information and a job from the storage unit 313, and outputs the instruction to the control unit 31.

Priority which is Set in Each Setting Item

Figure 3:
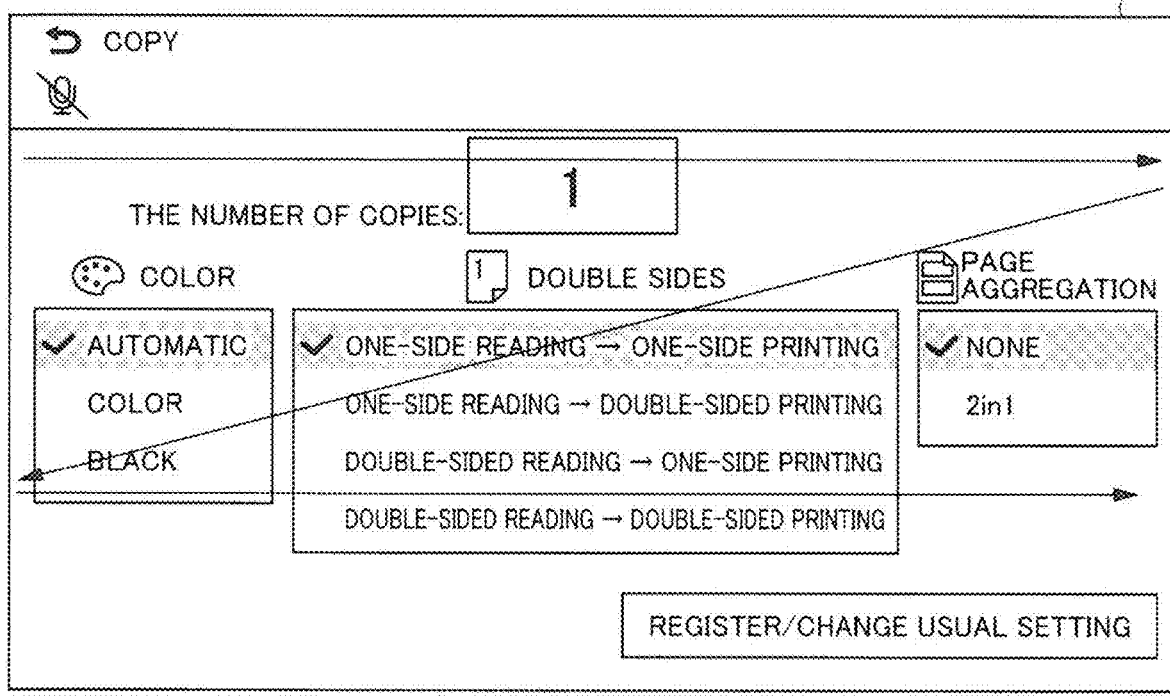
FIG. 3 is a diagram illustrating a display example of setting items related to a job of copying and an example of priority of a setting change which is set in each of the setting items according to the first embodiment of the present invention.

Referring now to FIGS. 3 and 4, the priority which is set in each setting item will be described. FIG. 3 is a diagram illustrating a display example of setting items related to a job of copying and an example of priority of a setting change which is set in each of the setting items. FIG. 4 is a diagram illustrating a display example of setting items related to a job of scanning and an example of priority of a setting change which is set in each of the setting items.

FIG. 3 illustrates a copy setting screen Sc1 of the operation display unit 13 in which setting items related to a job of copying are displayed. In the copy setting screen Sc1 illustrated in FIG. 3, it is assumed that setting items of "the number of copies", "color", "double sides", and "page aggregation" are disposed in the order from top to bottom and from left to right. It is also assumed that the priority of setting changes is set in this order. That is, the setting item on which the highest priority is set is "the number of copies" and the setting item on which the lowest priority is set is "page aggregation".

In the item of "the number of copies", the user can set the desired number of sheets to be copied. In the item of "color", the user can select the color of a character and/or an image to be formed on a sheet from "automatic", "color", and "black". In the item of "double sides", the user can perform designation of a side to be read of a sheet by the image forming device 1 (one-side reading or double-sided reading) and designation of a side on which an image is to be formed (one-side printing or double-sided printing). In the item of "page aggregation", the user can select a setting of "none" (page aggregation is not performed) or "2 in 1". The user can perform setting and changing of each setting item by any of an operation to the screen of the operation display unit 13 and an instruction by utterance to the voice input/output device 2.

In the case where a change of setting values of a plurality of setting items is instructed by the user, the setting changing unit 172 changes the setting values of the setting items one by one in order from the setting value of a setting item on which the highest priority is set.

In the case where calling (reading) of a user's favorite setting (hereinbelow, called "usual setting") which is defined in advance is instructed by utterance of the user, the setting changing unit 172 changes the setting values of items which are set as "usual setting". The "usual setting" is made by a combination of a plurality of setting items and is stored in, for example, the storage unit 123 or the like.

FIG. 4 illustrates a scan setting screen Sc2 of the operation display unit 13 in which the setting items related to a job of scanning are displayed. In the scan setting screen Sc2 illustrated in FIG. 4, setting items of "destination 1", "destination 2", "color", "double sides", "resolution", "file format" and "original size" are disposed in the order from top to bottom and from left to right. It is assumed that the priority of changes is set in this order. That is, the setting item on which the highest priority is set is "destination", and the setting item on which the lowest priority is set is "original size".

In "destination 1" and "destination 2", the user can designate the destination of transmission of an image which is read by the image reading unit 14. In the item of "color", the user can select the color of a character and/or an image to be formed on a sheet from "automatic", "color", and "black". In the item of "double sides", the user can designate the side (one side or double sides) on which an image is formed.

In the item of "resolution", the user can select the resolution of the read image from "200 dpi", "300 dpi", "400 dpi", and "600 dpi". In the item of "file format", the user can select the file format of the read image from "compact PDF", "PDF", "JPEG (Joint Photographic Experts Group)", and "TIFF (Tagged Image File Format)". The compact PDF is the format of a file generated by using the compact PDF converting technique of compressing the file size by dividing scanned data into an image region and a character region and performing a process adapted to each of the regions.

In the case where changing of setting values of a plurality of setting items is instructed by the user, the setting changing unit 172 changes the setting values of the setting items one by one in the priority order from the setting value of a setting item on which the highest priority is set.

In the embodiment, the example that the order of priority of changing of the setting items is the same as the display order of the setting items in the screen of the operation display unit 13 has been described. However, the present invention is not limited to the example. The order different from the display order of the setting items in the screen of the operation display unit 13 may be assigned to the order of priority of changing of the setting items.

Combination Inhibition Determining Process by Combination Inhibition Determining Unit and Priority Changing Process by Setting Order Control Unit Next, with reference to FIGS. 5 to 7, the combination inhibition determining process by the combination inhibition determining unit 173 of the image forming device 1 and the priority changing process by the setting order control unit 174 will be described. FIGS. 5A and 5B are tables illustrating an example of conditions which are referred to by the combination inhibition determining unit 173 at the time of a first combination inhibition determining process and an example of a process executed by the setting order control unit 174. FIGS. 6A and 6B are tables illustrating an example of conditions which are referred to by the combination inhibition determining unit 173 at the time of a second combination inhibition determining process and an example of a process executed by the setting order control unit 174. FIG. 7 is a flowchart illustrating an example of the procedure of the combination inhibition determining process by the combination inhibition determining unit 173 and the priority changing process by the setting order control unit 174.

FIG. 5A illustrates an example of conditions determined in the first combination inhibition determining process by the combination inhibition determining unit 173. The first combination inhibition determining process is a process performed in the case where the instruction receiving unit 171 of the image forming device 1 receives an instruction related to setting of a job. The conditions determined in the first combination inhibition determination are the following first and second conditions.

The first condition is satisfied when "compact PDF" is included in any of the following setting items (a) and (b).

(a) The setting item of "file format" displayed on the screen of the operation display unit 13 (an example of the first setting item)

(b) The setting item of "file format" of "usual setting" which is read on the basis of a voice operation (an example of the first setting item)

The second condition is satisfied when both of the following setting item (c) and the setting value (d) are included in setting contents instructed to be changed by the voice operation.

(c) "color" (an example of the second setting item) is "black"

(d) "file format" is "PDF" or "TIFF"

FIG. 5B illustrates an example of a process by the setting order control unit 174. As illustrated in FIG. 5B, in the case where the combination inhibition determining unit 173 determines that both the first and second conditions are satisfied, the setting order control unit 174 performs a process of changing the priority which is set in the setting item. Concretely, the priority which is set in the setting item of "file format" is changed to the highest priority. In the case where the setting item of the destination of transmitting scan data (hereinbelow, simply called "destination") is included in the setting item, the priority of the setting item of "file format" is changed to the next priority of the setting item of "destination" of the highest priority. On the other hand, when both of the first and second conditions are not satisfied, the second combination inhibition determining process is executed.

FIGS. 6A and 6B illustrate an example of conditions of determination made by the combination inhibition determining unit 173 in the second combination inhibition determining process. The conditions determined in the second combination inhibition determination are the following third and fourth conditions.

The third condition is satisfied when "compact PDF" or "JPEG" is included in any of the following setting items (a) and (b).

(a) the setting item displayed on the screen of the operation display unit 13

(b) the setting item of "usual setting" which is read on the basis of voice operation The fourth condition is satisfied when both of the following setting item and the setting value of (e) and (f) are included in the setting contents instructed to be changed by the voice operation.

(e) "resolution" (an example of the second setting item) is "400 dpi" or "600 dpi"

(f) "file format" is other than "compact PDF" and "JPEG"

FIG. 6B illustrates an example of the process by the setting order control unit 174. As illustrated in FIG. 6B, in the case where the combination inhibition determining unit 173 determines that both of the third and fourth conditions are satisfied, the setting order control unit 174 performs a process of changing the priority which is set in the setting item in a manner similar to the first combination inhibition determining process. Concretely, the priority which is set in the setting item of "file format" is changed to the highest priority. In the case where the setting item of "destination" is included in the setting items, the priority of the setting item of "file format" is changed to the priority next to the setting item of the destination of the highest priority.

On the other hand, in the case where both of the third and fourth conditions are not satisfied, the combination inhibition determining unit 173 does not perform the process of changing the priority which is set in the setting item.

Next, referring to FIG. 7, the procedure of the combination inhibition determining process by the combination inhibition determining unit 173 and the priority changing process by the setting order control unit 174 will be described.

First, the combination inhibition determining unit 173 determines whether or not the instruction receiving unit 171 receives an instruction to change a setting of a job, which is input from the user by the voice operation (step S1). When it is determined in step S1 that the instruction to change a setting of a job is not received (the case of NO determination in step S1), the control unit 12 repeats the determination of step S1.

On the other hand, when it is determined in step S1 that an instruction to change a setting of a job is received (the case of YES determination in step S1), the combination inhibition determining unit 173 determines whether the setting content instructed to be changed satisfies both of the first and second conditions illustrated in FIG. 5A (step S2).

When it is determined in step S2 that the setting content instructed to be changed satisfies both of the first and second conditions (the case of YES determination in step S2), the setting order control unit 174 performs a process of changing the priority which is set in the setting item (step S3). Subsequently, the setting changing unit 172 changes the content of each setting item in the order of the set priority (step S4).

On the other hand, when it is determined in step S2 that the setting content instructed to be changed does not satisfy both of the first and second conditions (the case of NO determination in step S2), the setting order control unit 174 determines whether the setting content instructed to be changed satisfies both of the third and fourth conditions illustrated in FIG. 7A (step S5).

When it is determined in step S5 that the setting content instructed to be changed satisfies both of the third and fourth conditions (the case of YES determination in step S5), the setting order control unit 174 performs the process of step S3. That is, the setting order control unit 174 performs a process of changing the priority set in the setting item.

On the other hand, when it is determined in step S4 that the setting content instructed to be changed does not satisfy both of the third and fourth conditions (the case of NO determination in step S4), the setting order control unit 174 does not perform the process of changing the priority set in the setting item. After that, the process of step S4, that is, the process of changing the content of each setting item is performed by the setting changing unit 172 in accordance with the set priority.

Process Condition Setting Process by Image Processing System

Figure 9:
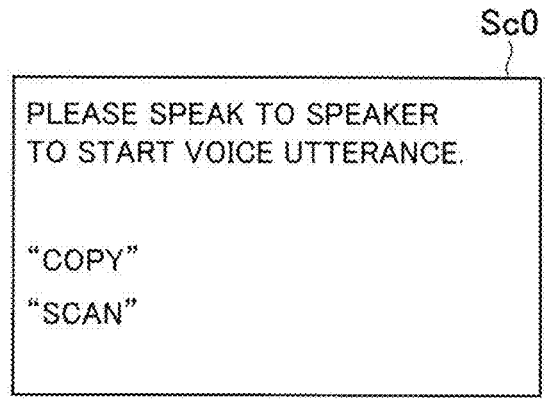
FIG. 9 is a diagram illustrating an example of a voice operation reception screen displayed in an operation display unit of the image forming device according to the first embodiment of the present invention.
Figure 10:
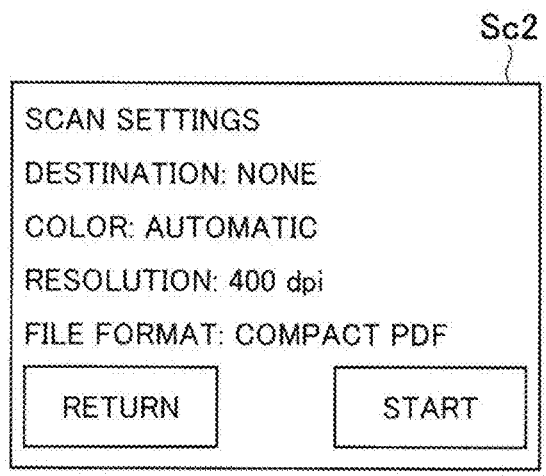
FIG. 10 is a diagram illustrating an example of a scan setting confirmation screen displayed in the operation display unit of the image forming device according to the first embodiment of the present invention.
Figure 11:
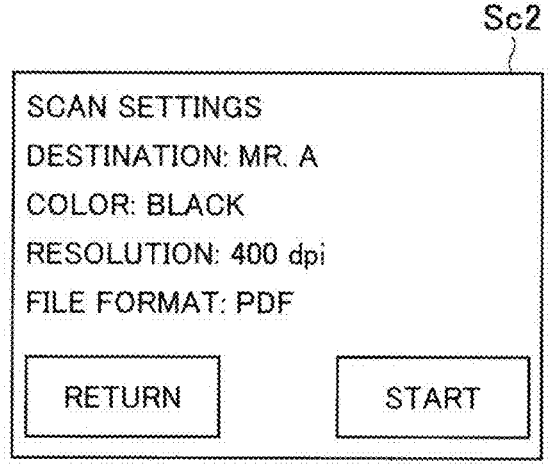
FIG. 11 is a diagram illustrating an example of the scan setting confirmation screen displayed in the operation display unit of the image forming device according to the first embodiment of the present invention.

Next, with reference to FIGS. 8 to 11, the process condition setting process by the image processing system 100 will be described. FIG. 8 is a sequence chart illustrating an example of the procedure of a process condition setting process by the image processing system 100. FIG. 9 is a diagram illustrating an example of a voice operation reception screen Sc0 displayed in the operation display unit 13 of the image forming device 1. FIGS. 10 and 11 are diagrams illustrating an example of a scan setting confirmation screen Sc3 displayed in the operation display unit 13 of the image forming device 1.

First, an utterance instruction of "scan" by the user is input to the voice input/output device 2 (step S11). The utterance instruction by the user is performed, for example, in a state where the voice operation reception screen Sc0 illustrated in FIG. 9 is displayed in the operation display unit 13. In the voice operation reception screen Sc0 illustrated in FIG. 9, a message "Please speak to the speaker to start voice utterance. "copy" "scan"" is displayed.

Description will be continued with reference again to FIG. 8. After the process of step S11, voice data in response to the voice "scan" is transmitted from the voice input/output device 2 to the voice processing server 3 (step S12). Subsequently, an instruction to start the scan setting screen Sc2 (refer to FIG. 4) is transmitted from the voice processing server 3 to the image forming device 1 (step S13). Then, in the image forming device 1, the scan setting screen Sc2 is started (step S14).

Subsequently, a notice of completion of start of the scan setting screen Sc2 is transmitted from the image forming device 1 to the voice processing server 3 (step S15). After that, the process result is notified from the voice processing server 3 to the voice input/output device 2 (step S16). That is, the completion of the start of the scan setting screen Sc2 in the image forming device 1 is notified. Subsequently, a message of the presence/absence of execution of a change of the setting "Scan is accepted. Do you want to change settings?" is output by voice from the voice input/output device 2 to the user (step S17).

At this time, in the operation display unit 13, for example, the scan setting confirmation screen Sc3 illustrated in FIG. 10 is displayed. The title of "scan settings" is displayed in the uppermost line in the scan setting confirmation screen Sc3 and, below it, the setting contents at the present time point are displayed as items. Concretely, "destination: none", "color: automatic", "resolution: 400 dpi", and "file format: compact PDF" are displayed. In the lowest line of the scan setting confirmation screen Sc3, the "return" button and the "start" button are disposed.

Description will be continued with reference again to FIG. 8. After the process of step S17, an utterance instruction "send in color black and PDF to Mr. A" is input by the user to the voice input/output device 2 (step S18). Subsequently, voice data responding to the voice of the utterance instruction is transmitted as a request from the voice input/output device 2 to the voice processing server 3 (step S19).

Subsequently, a voice data syntax analysis process and a change-instructed setting value generating process are performed by the voice processing server 3 (step S20). In step S20, a change-instructed setting value of "destination: Mr. A, color: black, file format: PDF" is generated. After that, the change-instructed setting value is transmitted from the voice processing server 3 to the image forming device 1 (step S21).

The necessity of rearrangement of the setting order is determined by the combination inhibition determining unit 173 of the image forming device 1 (step S22). In step S22, the combination inhibition determining unit 173 determines whether or not a setting item and a setting value causing combination inhibition are included in the change instruction transmitted from the voice processing service 3. Concretely, the first and second combination inhibition determining processes described with reference to FIGS. 5 and 6 are performed.

In the first combination inhibition determining process, first, the combination inhibition determining unit 173 determines whether the change-instructed setting value satisfies the first condition or not. Concretely, whether or not "compact PDF" is included in any of the setting item displayed in the screen (in this case, the scan setting confirmation screen Sc3) of the operation display unit 13 and the setting item of "usual setting" read by the voice operation is determined. Since "compact PDF" is included in the scan setting confirmation screen Sc3 illustrated in FIG. 10, the combination inhibition determining unit 173 determines that the first condition is satisfied.

Next, the combination inhibition determining unit 173 determines whether the change-instructed setting value satisfies the second condition or not. Concretely, whether both "color: black" and "file format: PDF or TIFF" are included in the change instruction (utterance instruction) by the voice operation is determined. In the example illustrated in FIG. 8, both "color: black" and "file format: PDF" are included in the utterance instruction. Therefore, since both the first and second conditions are satisfied, in step S22, it is determined that rearrangement of the setting order is necessary.

Subsequently, the setting order control unit 174 changes the priority which is set in the setting item (step S23). Concretely, the setting order control unit 174 changes the priority set in the setting item of "file format" to the highest priority (in the example illustrated in FIG. 8, the priority next to the highest priority which is set in "destination").

As illustrated in FIG. 4, the priority of the setting change which is set in the setting item of "color" is higher than that of "file format". Therefore, in the case of changing the setting item in accordance with the priority which is set without changing the priority, first, "color" is changed from "automatic" which is set in the scan setting confirmation screen Sc3 illustrated in FIG. 10 to "black" based on the utterance instruction. At the time point of execution of the change, combination inhibition occurs between "black" of "color" and "compact PDF" of "file format" displayed in the scan setting confirmation screen Sc3 (refer to FIG. 10).

However, in the embodiment, in step S23, the priority which is set in the setting item of "file format" is changed to the highest priority (specifically, the priority next to the priority which is set in "destination"). The setting changing unit 172 changes each of the set values of the setting items one by one in order from the set highest priority (step S24).

In response to the change of the priority which is set in the setting item of "file format" to the higher priority in step S23, first, the content of the setting item is changed by the setting changing unit 172 from "file format". That is, "compact PDF" of "file format" displayed in the scan setting confirmation screen Sc3 is changed to "PDF". By executing the change, combination inhibition between the setting items does not occur. Concretely, combination inhibition does not occur between "PDF" of "file format" after the change and "automatic" of "color" before the change. Therefore, the setting changing unit 172 can change the setting item as the change instruction.

Subsequently, the setting contents after the change are transmitted from the image forming device 1 to the voice processing server 3 like "destination: Mr. A, color: black, file format: PDF" (step S25).

After that, voice data as a response to the request transmitted in step S19 is transmitted from the voice processing server 3 to the voice input/output device 2 (step S26). In step S26, voice data such as, for example, "Mr. A as destination, color black, and format PDF is accepted. Do you start transmission?" is transmitted from the voice processing server 3 to the voice input/output device 2. Subsequently, voice corresponding to the voice data transmitted from the voice processing server 3 in step S26 is output from the voice input/output device 2 (step S27).

FIG. 11 illustrates an example of setting items after a change by the setting changing unit 172 is executed. FIG. 11 is a diagram illustrating an example of the scan setting confirmation screen Sc3 after execution of the change. The title of "scan setting" is displayed in the uppermost line in the scan setting confirmation screen Sc3 illustrated in FIG. 11 and, below it, setting contents after the change are displayed as items. Concretely, "destination: Mr. A", "color: black", "resolution: 400 dpi", and "file format: PDF" are displayed. Also in the lowest line of the scan setting confirmation screen Sc3, "return" button and "start" button are disposed.

In the above-described embodiment, also in the case where combination inhibition occurs between the change item of the setting instructed by user's utterance and its setting value (change-instructed setting value) and the setting item and its setting value which are presently set (set setting value), the priority of the setting change is changed by the setting order control unit 174 and, then, the change is executed by the setting changing unit 172. Therefore, in the embodiment, occurrence of a combination inhibition error in the case where an instruction of changing setting contents of a plurality of settings is given by utterance of the user can be prevented. According to the embodiment, the user can instruct a setting change by a voice operation without fear of occurrence of an error that a setting change is impossible due to combination inhibition or without thinking a combination not to cause combination inhibition.

Modification of First Embodiment

Configuration of Control System of Image Forming Device and Voice Processing Server Next, referring to FIG.

Figure 12:
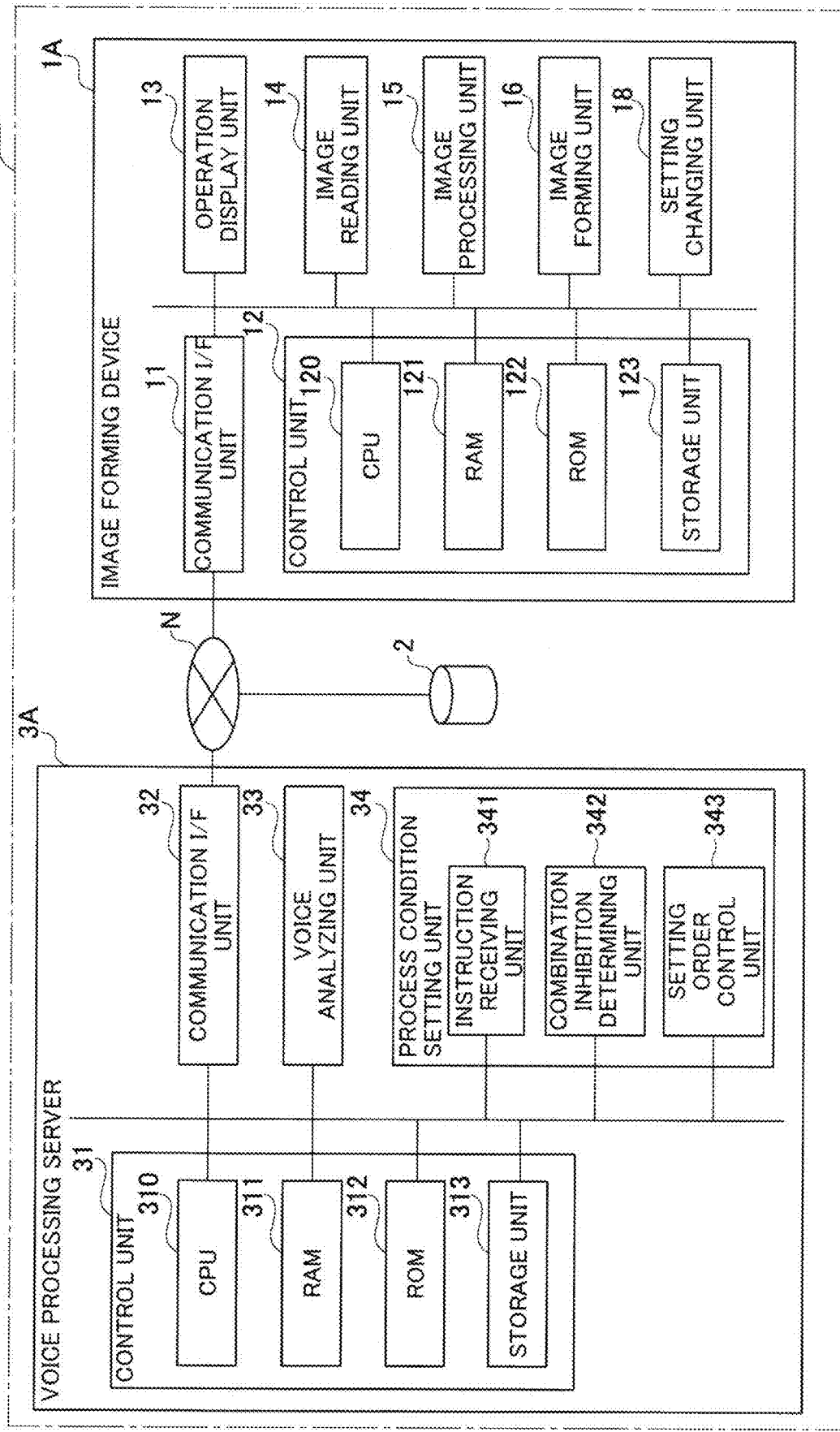
FIG. 12 is a block diagram illustrating a configuration example of a control system of an image forming device and a voice processing server according to a modification of the first embodiment of the present invention.

12, the configuration of a control system of an image forming device 1A and a voice processing server 3A of an image processing system 100A (an example of a process condition setting system) according to a modification of the first embodiment of the present invention will be described. FIG. 12 is a block diagram illustrating a configuration example of a control system of the image forming device 1A and the voice processing server 3A according to the modification of the first embodiment of the present invention. Since the configuration of the image processing system 100A according to the modification of the first embodiment is the same as that illustrated in FIG. 1, its description will be given here.

The image processing system 100A according to the modification of the first embodiment is different from the image processing system 100 according to the first embodiment with respect to the point that the configuration of the process condition setting unit is dispersed to the voice processing server 3 and the image forming device 1A. Concretely, in the modification, an instruction receiving unit 341, a combination inhibition determining unit 342, and a setting order control unit 343 in a process condition setting unit 34 are provided in the voice processing server 3A, and a setting changing unit 18 is provided in the image forming device 1A.

The configuration of the voice processing server 3A other than the process condition setting unit 34 is the same as that of the voice processing server 3 illustrated in FIG. 2. The configuration of the control system of the image forming device 1A other than the setting changing unit 18 is the same as that in the image forming device 1 illustrated in FIG. 2 other than the process condition setting unit 17. Therefore, the description of those units is omitted here.

Process Condition Setting Process by Image Processing System

Figure 13:
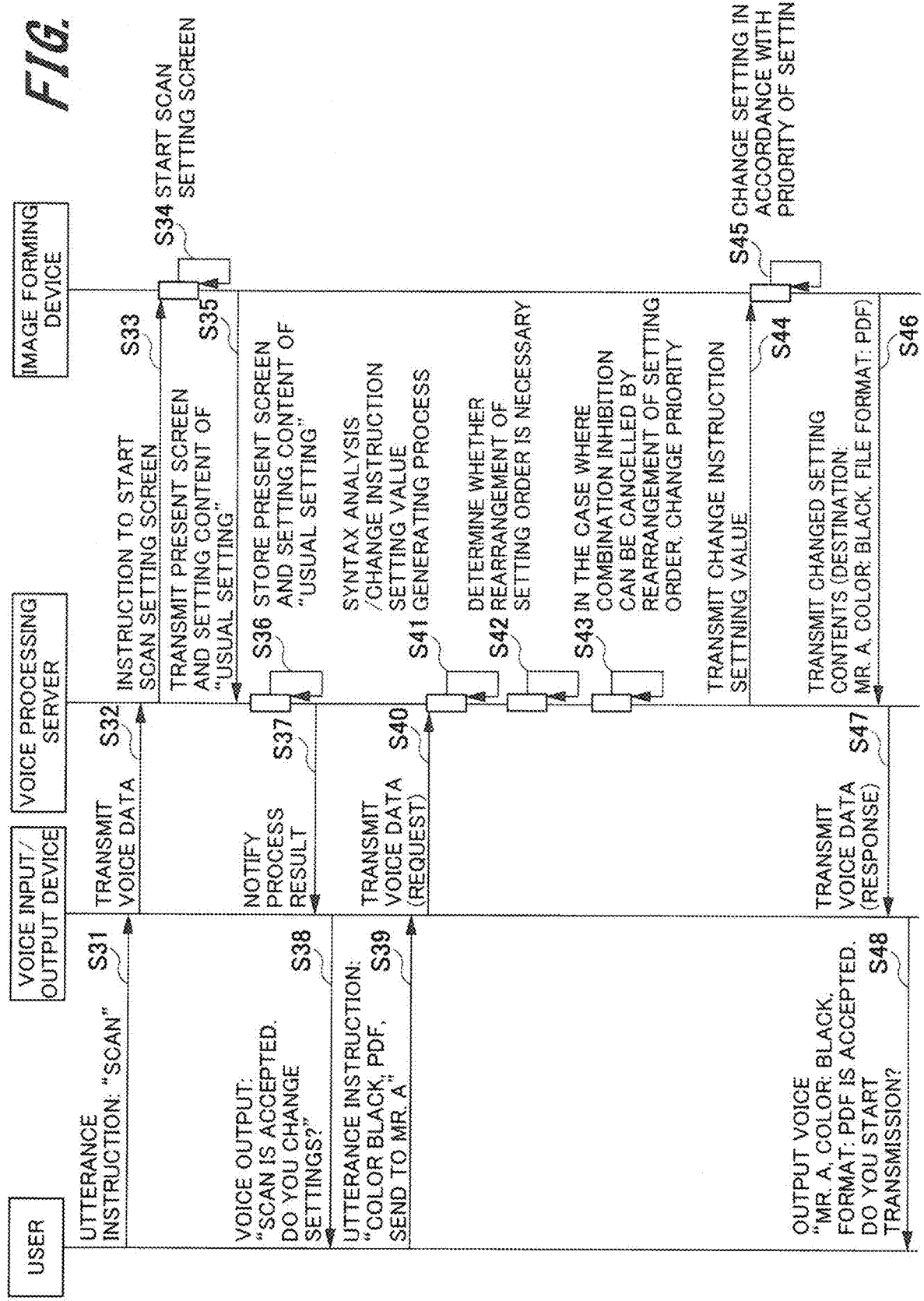
FIG. 13 is a sequence chart illustrating an example of the procedure of a process condition setting process by an image processing system according to the modification of the first embodiment of the present invention.

Next, referring to FIG. 13, the process condition setting process by the image processing system 100A will be described. FIG. 13 is a sequence chart illustrating an example of the procedure of the process condition setting process by the image processing system 100A.

First, an utterance instruction of "scan" by the user is input to the voice input/output device 2 (step S31). Subsequently, voice data corresponding to the voice of "scan" is transmitted from the voice input/output device 2 to the voice processing server 3A (step S32). An instruction of starting the scan setting screen Sc2 (refer to FIG. 4) is transmitted from the voice processing server 3A to the image forming device 1A (step S33). Then, the scan setting screen Sc2 is started in the image forming device 1A (step S34).

From the image forming device 1A to the voice processing server 3A, setting contents displayed in the screen which is displayed at present in the operation display unit 13 (refer to FIG. 12) and the setting contents of "usual setting" are transmitted (step S35). In the voice processing server 3A, the setting contents of the present screen and the setting contents of "usual setting" transmitted from the image forming device 1A in step S35 are stored in the storage unit 313 (step S36).

Subsequently, a process result is notified from the voice processing server 3A to the voice input/output device 2 (step S37). Then, a message of the presence/absence of execution of a change of the setting contents to the user, "Scan is accepted. Do you change the settings?", is output as voice from the voice input/output device 2 (step S38).

Subsequently, by the user, an utterance instruction to "color black, PDF, send to Mr. A" is input to the voice input/output device 2 (step S39). From the voice input/ output device 2 to the voice processing server 3A, voice data corresponding to the voice of the utterance instruction is transmitted as a request (step S40).

By the voice processing server 3A, a process of syntax analysis of voice data and a change-instructed setting value generating process are performed (step S41). By the combination inhibition determining unit 342 (refer to FIG. 12) of the voice processing server 3A, the necessity of rearrangement of the setting order is determined (step S42). In the case where it is determined that rearrangement of the setting order is necessary, the setting order control unit 343 of the voice processing server 3A changes the priority which is set in the setting item (step S43).

Subsequently, a change-instructed setting value is transmitted from the voice processing server 3A to the image forming device 1A (step S44). At this time, together with the change-instructed setting value, information of the priority of the setting change given to each setting is also transmitted. The setting changing unit 18 of the image forming device 1A changes the contents of the setting items in order of the priority which is set (step S45). After that, the setting contents after the change are transmitted like "destination: Mr. A, color: black, file format: PDF" from the image forming device 1A to the voice processing server 3A (step S46).

Subsequently, voice data as a response to a request transmitted in step S40 is transmitted from the voice processing server 3A to the voice input/output device 2 (step S47). In step S47, voice data such as, for example, "Destination Mr. A, color black, format PDF is accepted. Do you start transmission?" is transmitted from the voice processing server 3A to the voice input/output device 2. From the voice input/output device 2, voice corresponding to the voice data transmitted from the voice processing server 3A in step S47 is output (step S48).

Also by the modification of the first embodiment, effects similar to those obtained by the first embodiment can be obtained.

Second Embodiment

Outline of Process Condition Setting Process by Image Processing System

Figure 14:
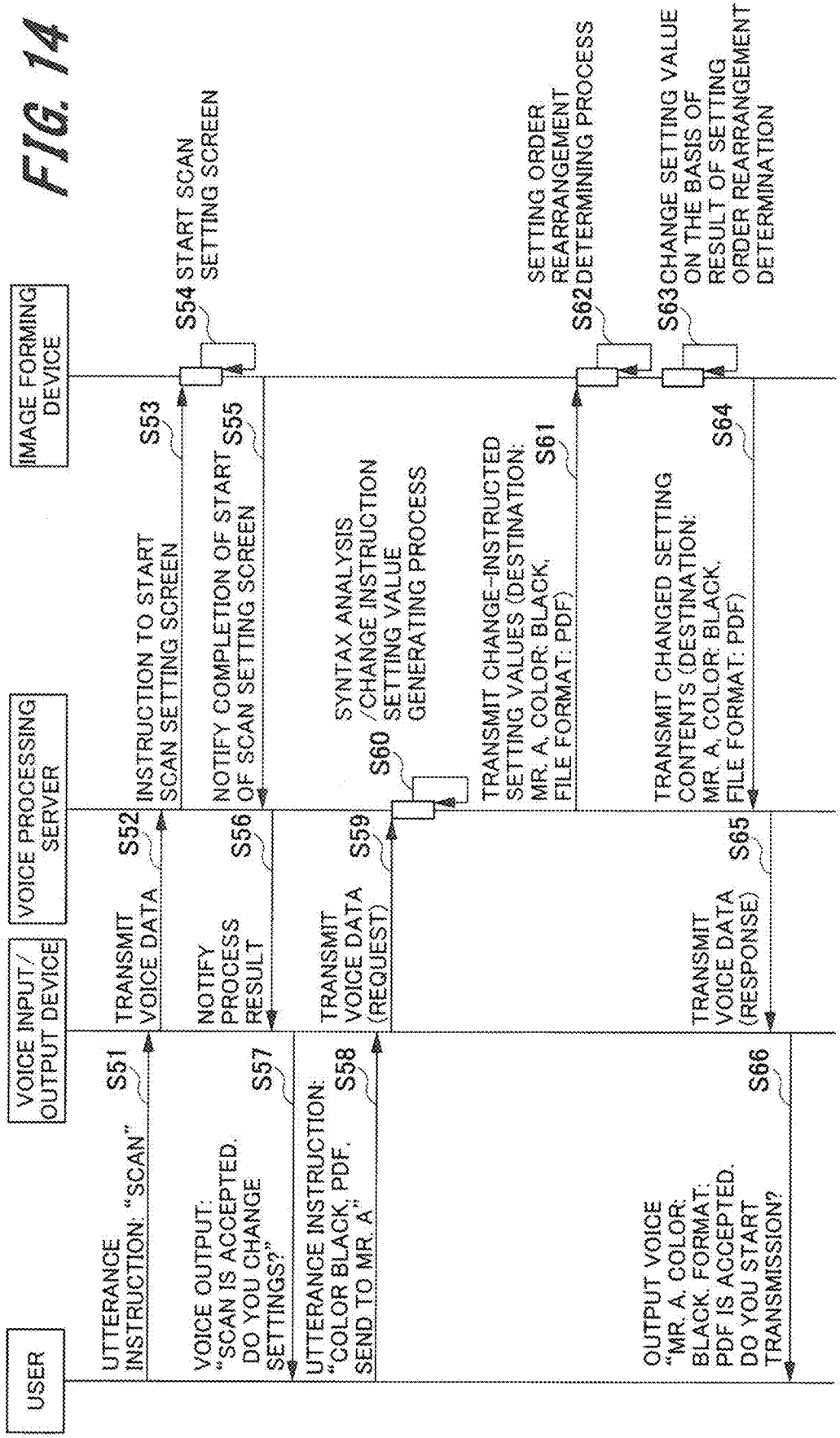
FIG. 14 is a sequence chart illustrating an example of the procedure of a process condition setting process by an image processing system according to a second embodiment of the present invention.

Next, referring to FIG. 14, a process condition setting process by an image processing system according to a second embodiment of the present invention will be described. FIG. 14 is a sequence chart illustrating an example of the procedure of a process condition setting process by an image processing system according to the second embodiment of the present invention.

It is assumed that the image processing system performing the process illustrated in FIG. 14 has the same configuration as that of the image processing system 100 according to the first embodiment illustrated in FIG. 2, that is, the configuration that the process condition setting unit 17 is provided in the image forming device 1.

Since processes in steps S51 to S61 in the process condition setting process illustrated in FIG. 14 are the same as the processes in steps S11 to S21 in the process condition setting process illustrated in FIG. 8, description of those steps will be omitted.

After the process of step S61, that is, after the change-instructed setting value is transmitted from the voice processing server 3 to the image forming device 1, the image forming device 1 performs a setting order rearrangement determining process (step S62). Subsequently, the image forming device 1 changes the setting order on the basis of the setting order rearrangement determining process (step S63). Since the processes of steps S64 to S66 are the same as those of steps S46 to S48 in the process condition setting process illustrated in FIG. 13, description of those steps will be omitted.

In the setting order rearrangement determining process of step S62, the setting order control unit 174 (refer to FIG. 2) of the image forming device 1 generates combination patterns of all of assumable setting orders (hereinafter, called "setting order patterns") as setting orders of a plurality of setting items included in the change instructions received by the instruction receiving unit 171.

For example, it is assumed that setting change instructions received by the instruction receiving unit 171 are the following three instructions.
1. Color: black
2. Resolution: 600 dpi
3. file format: PDF In this case, the setting order control unit 174 generates the following six setting order patterns as all of assumable setting order patterns which are assumed as setting orders of the above-descried setting items 1 to 3. In the following setting order patterns, the setting items are indicated by the above-described numbers 1 to 3.
Pattern 1: 1 (color), 2 (resolution), 3 (file format)
Pattern 2: 1, 3, 2
Pattern 3: 2, 1, 3
Pattern 4: 2, 3, 1
Pattern 5: 3, 1, 2
Pattern 6: 3, 2, 1

A setting order pattern can be generated by using, for example, a general library or the like.

Subsequently, the setting order control unit 174 determines validity/invalidity of a change to a change-instructed setting value of the set value on the basis of the setting order of each of the setting order patterns in the setting order rearrangement determining process. Concretely, the setting value of the setting item is changed to the setting value instructed to be changed by the voice operation in accordance with the setting order specified in each of the patterns 1 to 6, and the number of setting items in which setting change becomes valid (hereinafter, called "the number of valid setting changes) is calculated. A setting item in which setting change becomes valid is a setting item in which a setting can be changed without causing combination inhibition).

Figures 15, 16:
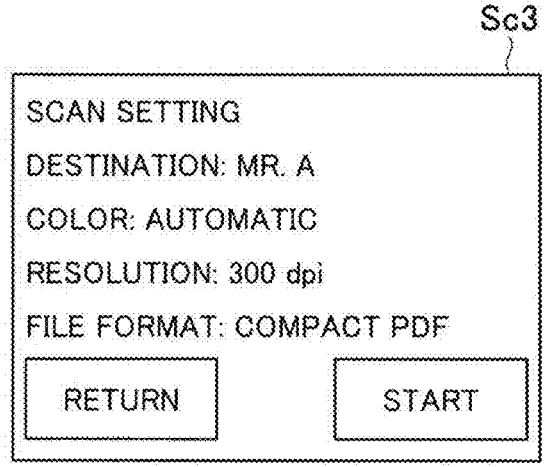
FIG. 15 is a diagram illustrating an example of a scan setting confirmation screen displayed in an operation display unit of an image forming device according to the second embodiment of the present invention.
FIG. 16 is a diagram illustrating an example of a setting change result by a setting order control unit according to the second embodiment of the present invention.

FIG. 15 is a diagram illustrating an example of the scan setting confirmation screen Sc3 displayed in the operation display unit 13 of the image forming device 1. In the example illustrated in FIG. 15, in the scan setting confirmation screen Sc3, as the setting contents at the present time point, "destination: Mr. A", "color: automatic", "resolution: 300 dpi", and "file format: compact PDF" are displayed.

FIG. 16 is a diagram illustrating an example of results of the setting change by the setting order control unit 174. In the example illustrated in FIG. 16, the setting change result includes the items of "pattern", "setting order", "setting result", and "the number of valid setting changes". In the item of "pattern", serial numbers allocated to the setting order patterns are stored. In "setting order", the setting order is stored. In "setting result", setting results of the setting items (setting change result) in the case where setting values of the setting items are changed in the setting order written in "setting order" are stored. In "the number of valid setting changes", the number of setting items in which a change in setting is valid in the setting result is stored.

For example, in "pattern 1", the setting order control unit 174 changes the setting values of the setting items to setting values instructed to be changed by voice operation in accordance with the setting order "1, 2, 3". Specifically, the color "1" in the scan setting confirmation screen Sc3 illustrated in FIG. 15 is changed from "automatic" as the present setting value to "black" as the change-instructed setting value. In this case, the combination between "black" as the color after the change and "compact PDF" of the file format is inhibited, so that the setting change is invalid. That is, the setting result of the color "1" is "x" (not good).

Next, the setting order control unit 174 changes the resolution "2" from "300 dpi" as the present setting value to "600 dpi" as the change instruction setting value. In this case, the combination between "600 dpi" of the resolution after the change and "compact PDF" of the file format in the present setting is inhibited, so that the setting change is invalid. That is, the setting result of the resolution "2" is also "x".

Finally, the setting order control unit 174 changes the file format "3" from "compact PDF" as the present setting value to "PDF" as the change-instructed setting value. In this case, combination inhibition does not occur in the combination between the setting value before the change and the setting value after the change, so that the setting change is valid. That is, the setting result of the file format "3" is "O" (good). Since the number of setting items in which the change of setting is valid is one in the setting results of "pattern 1", "the number of valid setting changes" in "pattern 1" is "1".

The setting order control unit 174 executes the above-described processes on all of the patterns 1 to 6.

First, the setting order control unit 174 determines whether or not there is a setting order pattern in which the number of valid setting changes is the same as that of setting items, that is, a setting order pattern in which changes of all of setting values are valid. When it is determined that there is a setting order pattern in which changes of all of setting values are valid, the setting order control unit 174 changes the change order of setting values of a plurality of setting items to change-instructed setting values in the setting order specified in the setting order pattern.

Since the setting order pattern in which changes of all of setting values are valid is "pattern 5" in the example illustrated in FIG. 16, the setting order control unit 174 changes the change order of the setting values of the setting items to "3, 2, 1" as the setting order illustrated in "pattern 5". The setting changing unit 172 changes the setting values of the setting items in the order of "file format" of "3", "resolution" of "2", and "color" of "1". Consequently, first, the file format is changed from "compact PDF" to "PDF", next, the resolution is changed from "300 dpi" to "600 dpi", and finally, color is changed from "automatic" to "black".

Figure 17:
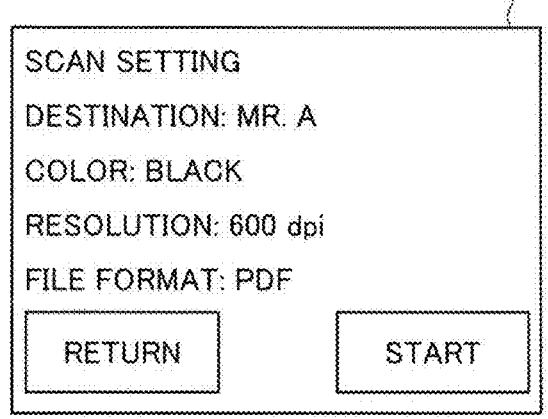
FIG. 17 is a diagram illustrating an example of the scan setting confirmation screen displayed in the operation display unit of the image forming device according to the second embodiment of the present invention.

The change result of the setting values changed by the setting changing unit 172 on the basis of the setting change result illustrated in FIG. 16 will be described. FIG. 17 is a diagram illustrating an example of the scan setting confirmation screen Sc3 displayed in the operation display unit 13 of the image forming device 1. When the process condition setting process of the embodiment is performed, as illustrated in FIG. 17, in the scan setting, "destination" is set to "Mr. A (no setting change), "color" is set to "black", "resolution" is set to "600 dpi", and "file format" is set to "PDF".

Procedure of Process Condition Setting Process by Image Processing System

Figure 18:
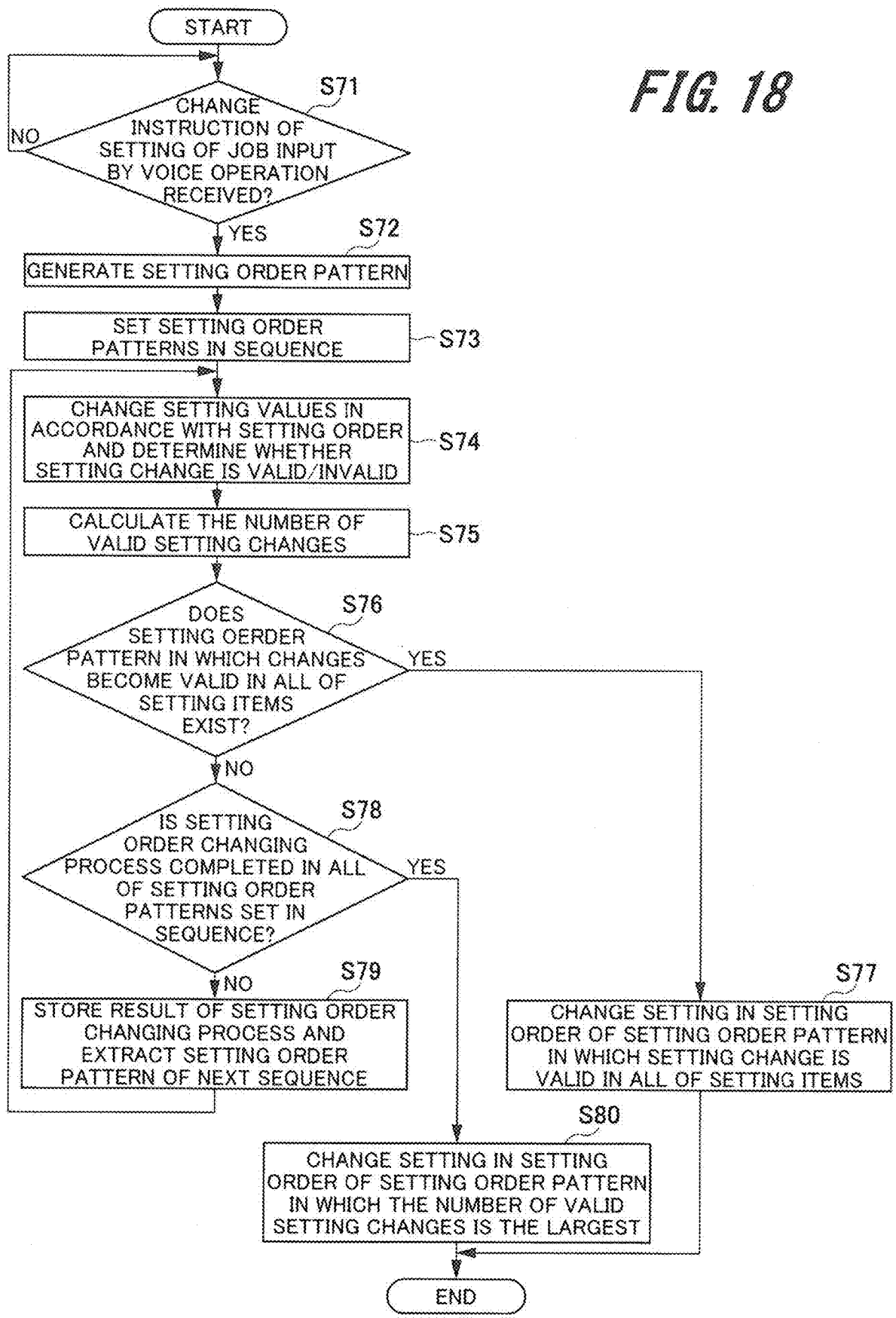
FIG. 18 is a flowchart illustrating an example of the procedure of a process condition setting process by the image processing system according to the second embodiment of the present invention.

Next, referring to FIG. 18, the procedure of the process condition setting process by the image processing system 100 according to the second embodiment of the present invention will be described. FIG. 18 is a flowchart illustrating an example of the procedure of a process condition setting process by the image processing system 100 according to the second embodiment of the present invention.

First, the control unit 12 (refer to FIG. 2) of the image forming device 1 determines whether or not the instruction receiving unit 171 receives an instruction to change the setting of a job which is input from the user by voice operation (step S71). When it is determined in step S71 that an instruction of job setting change is not received (in the case of NO determination in step S71), the control unit 12 repeats the determination of step S71.

On the other hand, when it is determined in step S71 that an instruction of job setting change is received (in the case of YES determination in step S71), the setting order control unit 174 generates a setting order pattern of setting items included in the change instruction (step S72). Subsequently, the setting order control unit 174 sets all of generated setting order patterns in one sequence (step S73). Then, the setting order control unit 174 extracts one setting order pattern which is set in the sequence, changes setting values of the setting items in accordance with the setting order displayed in the setting order pattern, and checks whether the change of the setting becomes valid or invalid (step S74).

Subsequently, the setting order control unit 174 calculates the number of setting items which are determined in step S74 that the setting change is valid, that is, the number of valid setting changes (step S75). The setting order control unit 174 determines whether there is a setting order pattern in which changes of all of setting items are valid (step S76). That is, the setting order control unit 174 determines whether there is a setting order pattern in which the number of setting items and the number of valid setting changes are the same.

When it is determined in step S76 that there is a setting order pattern in which changes are valid in all of setting items (the case of YES determination in step S76), the setting changing unit 172 changes setting values of setting items in the setting order displayed in the setting order pattern (step S77). After the process of step S77, the control unit 12 finishes the process condition setting process.

On the other hand, when it is determined in step S76 that there is no setting order pattern in which changes are valid in all of setting items (the case of NO determination in step S76), the setting order control unit 174 determines whether the setting order rearrangement determining process in all of setting order patterns which are set in a sequence is completed (step S78).

When it is determined in step S78 that the setting order rearrangement determining process in all of the setting order patterns is not completed (the case of NO determination in step S78), the setting order control unit 174 stores the result of the process condition setting process and extracts a setting order pattern of a next sequence (step S79). After the process of step S79, the control unit 12 returns the process to step S74. That is, the control unit 12 extracts one setting order pattern which is set in the sequence, changes setting values of setting items in accordance with the setting order displayed in the setting order pattern, and checks whether the change of the setting is valid or invalid.

On the other hand, when it is determined in step S78 that the setting order rearrangement determining process in all of the setting order patterns is completed (the case of YES determination in step S78), the setting order control unit 174 changes the setting values of the setting items in the setting order displayed in the setting order pattern in which the number of valid setting changes is the largest (step S80). After the process of step S80, the control unit 12 finishes the process condition setting process.

In the above-described second embodiment, the setting order control unit 174 generates all of assumable setting order patterns as setting orders of a plurality of setting items included in a change instruction received by the instruction receiving unit 171. The setting order control unit 174 determines whether a change of a setting value to a setting value instructed to be changed by voice (change-instructed setting value) on the basis of a setting order of each of setting order patterns is valid or invalid (presence/absence of occurrence of combination inhibition) and, on the basis of the result of the determination, changes the change order to the change-instructed setting value of the set setting values of the plurality of setting items. The setting changing unit 172 changes the setting values in the setting order changed by the setting order control unit 174. That is, according to the embodiment, validity/invalidity of the change of the setting value is automatically determined in the image forming device 1, so that the designer who implements the process condition setting process according to the embodiment in the process condition setting system such as the image forming device does not have to grasp the presence/absence of occurrence of combination inhibition in advance and examine the process flow each time.

In the above-described second embodiment, the setting order control unit 174 obtains the number of valid setting changes as the number of setting items in which a setting value can be changed to a change-instructed setting value on the basis of the setting order in each of the setting order patterns, and determines whether a setting order pattern in which the number of valid setting changes and the number of setting items are the same exists or not. In the case where the setting order pattern exists, the setting order control unit 174 changes the changing order of setting values of a plurality of setting items to change-instructed setting values in the setting order of the setting order pattern. Consequently, according to the embodiment, when there is a setting order pattern in which the number of valid setting changes and the number of a plurality of setting items are the same, that is, a setting order pattern in which change to the change-instructed setting values, of the setting values in all of setting items is valid, change of the setting values of the plurality of setting items is executed swiftly. That is, setting values of a plurality of setting items can be changed without keeping the user waiting.

In the above-described second embodiment, in the case where a setting order pattern in which the number of valid setting changes and the number of a plurality of setting items are the same does not exist, the setting order control unit 174 changes a change order to change-instructed setting values of setting values of a plurality of setting items in a setting order pattern setting order in which the number of valid setting changes is largest in setting order patterns. Therefore, according to the embodiment, also when there is no setting order pattern in which the number of valid setting changes and the number of a plurality of setting items are the same, change of setting values of a plurality of setting items is executed swiftly. That is, without keeping the user waiting, setting values of a plurality of setting items can be changed.

Although the example of applying the process condition setting system according to the present invention to the image forming device 1 having the process condition setting unit 17 has been described in the foregoing second embodiment, the present invention is not limited to the example. The process condition setting system according to the present invention may also be applied to a system in which the configuration of the process condition setting unit is dispersed to the voice processing server and the image forming device like the image processing system 100A (refer to FIG. 12) according to the modification of the first embodiment.

Modification of Second Embodiment

Figure 19:
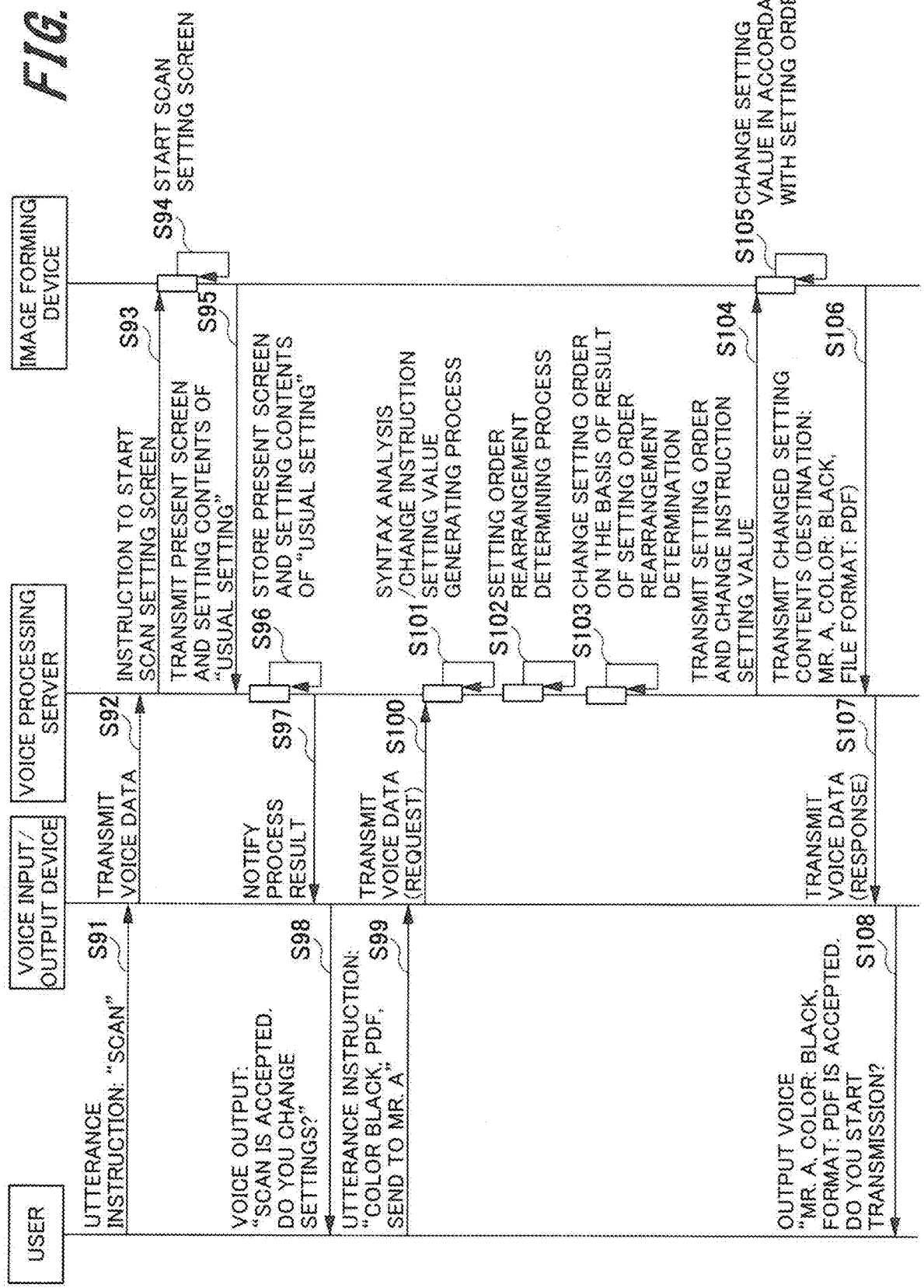
FIG. 19 is a sequence chart illustrating an example of the procedure of the process condition setting process by the image forming system according to the second embodiment of the present invention.

Outline of Process Condition Setting Process by Image Processing System Referring to FIG. 19, a process condition setting process by an image processing system according to a modification of the second embodiment of the present invention will be described. FIG. 19 is a sequence chart illustrating an example of the procedure of the process condition setting process by the image processing system according to the modification of the second embodiment of the present invention.

The image processing system performing processes illustrated in FIG. 19 has the same configuration as that of the image processing system 100A according to the modification of the first embodiment illustrated in FIG. 12. Specifically, the instruction receiving unit 341, the combination inhibition determining unit 342, and the setting order control unit 343 in the process condition setting unit are provided in the voice processing server 3A, and the setting changing unit 18 is provided in the image forming device 1A.

Since the processes of steps S91 to S101 in the process condition setting process illustrated in FIG. 19 are the same as those of steps S31 to S41 in the process condition setting process of the image processing system 100A illustrated in FIG. 13, description of the steps will be omitted.

After the process of step S101, that is, after a process of analyzing syntax of voice data and a change-instructed setting value generating process are performed by the voice processing server 3A, the voice processing server 3A performs a setting order rearrangement determining process (step S102). On the basis of the setting order rearrangement determining process, the voice processing server 3A changes the setting order (step S103). The voice processing server 3A transmits the setting order changed in step S103 and the change-instructed setting value to the image forming device 1A (step S104). Subsequently, the image forming device 1A changes the setting value to the change instruction setting value in accordance with the setting order transmitted from the voice processing server 3A (step S105).

Since the processes in steps S106 to step S108 are the same as those in steps S46 to S48 in the process condition setting process illustrated in FIG. 13, the steps will not be described.

Also by the image processing system 100A according to the modification of the second embodiment, effects similar to those obtained by the image processing system 100 according to the first embodiment can be obtained.

Third Embodiment

Next, a process condition setting process by an image processing system according to a third embodiment of the present invention will be described. In the third embodiment, the image processing system compares a setting item and its setting value (set setting value) instructed to be changed by voice and a setting value of a setting item which is set presently (set setting value). When there is a setting item which does not cause combination inhibition in setting items instructed to be changed by voice, the image processing system executes change of the setting value of the setting item first.

The image processing system according to the third embodiment has the same configuration as that of the image processing system 100 according to the first embodiment illustrated in FIG. 2. The image processing system according to the third embodiment may have the same configuration as that of the image processing system 100A according to the modification of the first embodiment illustrated in FIG. 12.

The image processing system 100 according to the third embodiment determines whether combination inhibition occurs between a setting item and its setting value instructed to be changed by voice and a setting value of a setting item which is presently set on the basis of a combination inhibition setting table or the like which is stored in advance in a storage unit or the like.

First, referring to FIG. 20, the configuration of a combination inhibition setting table will be described. FIG. 20 is a diagram illustrating a configuration example of a combination inhibition setting table T1. The combination inhibition setting table T1 has items of "combination inhibition occurrence condition", "setting inhibited to be combined", and "combination inhibition cancellation condition".

In the "combination inhibition occurrence condition", a setting item and its setting value, which may cause combination inhibition are stored. In "setting inhibited to be combined", a setting item and its set value, inhibited to be combined with the setting item and its setting value specified in the "combination inhibition occurrence condition", that is, a setting item and its setting value causing combination inhibition by being combined with the setting item and the setting value specified in the "combination inhibition occurrence condition" are stored. In "combination inhibition cancellation condition", a setting item and its setting value which can cancel combination inhibition by executing a change to the setting value are stored.

In the record of the highest line in the combination inhibition setting table T1, "file format: compact PDF" is stored in the "combination inhibition occurrence condition", and "color: black" and "resolution: 600 dpi" are stored in the "setting inhibited to be combined". In the "combination inhibition cancellation condition", "file format: PDF" is stored.

That is, the record of the highest line in the combination inhibition setting table T1 illustrates that the combination between the setting value "compact PDF" of the "file format" and "color: black" or "resolution: 600 dpi" causes combination inhibition. When the setting value "compact PDF" of the "file format" stored in the "combination inhibition occurrence condition" is changed to "PDF" stored in the combination inhibition cancelation condition, occurrence of the combination inhibition can be prevented. That is, it illustrates that the combination inhibition is cancelled. In the "setting inhibited to be combined", a plurality of setting items and their setting values can be stored.

Figure 21:
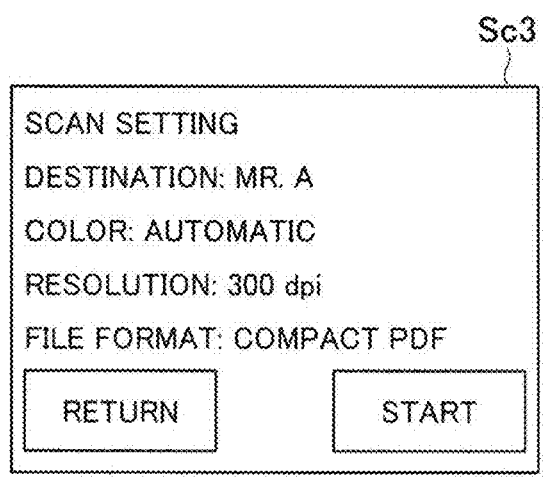
FIG. 21 is a diagram illustrating an example of a scan setting confirmation screen displayed in an operation display unit of an image forming device according to the third embodiment of the present invention.

A concrete example of the process condition setting process using the combination inhibition setting table T1 by the image processing system 100 according to the third embodiment will be described. FIG. 21 is a diagram illustrating an example of the scan setting confirmation screen Sc3 displayed in the operation display unit 13 (refer to FIG. 2) of the image forming device 1.

In the scan setting confirmation screen Sc3 illustrated in FIG. 21, as setting contents at the present time point, "destination: Mr. A", "color: automatic", "resolution: 300 dpi", and "file format: compact PDF" are displayed. It is assumed that the instruction receiving unit 171 receives the following three change instructions.

1. color: black 2. destination: Mr. B 3. file format: PDF

The setting order control unit 174 determines whether or not there is a setting item which does not cause combination inhibition in the setting items instructed to be changed by voice with reference to the combination inhibition setting table T1 (refer to FIG. 20). The "destination" in the setting items included in the instructions by the voice operation is not included in "combination inhibition occurrence condition" of the combination inhibition table T1. Therefore, the setting order control unit 174 determines that the setting item of "destination" is a setting item which does not cause combination inhibition and changes the setting order of the setting value of setting item of "destination" before the setting orders of the setting values of the other setting items.

Figure 22:
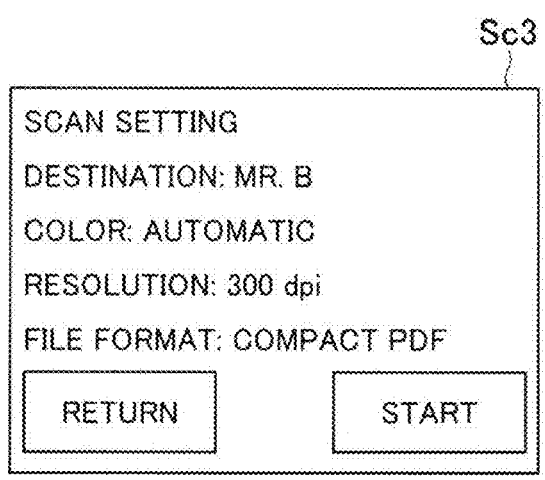
FIG. 22 is a diagram illustrating an image of a scan setting confirmation screen displayed in the operation display unit of the image forming device, in the case where a setting value of a setting item which does not cause combination inhibition is changed first, in the third embodiment of the present invention.

FIG. 22 is a diagram illustrating an image of the scan setting confirmation screen Sc3 displayed in the operation display unit 13 of the image forming device 1, in the case where a setting value of a setting item which does not cause combination inhibition is changed first. It is assumed that, in practice, the setting value of the scan setting confirmation screen Sc3 is not changed at this time point but, at the time point of completion of the change of all of the setting values, the setting values in the scan setting confirmation screen Sc3 are changed.

As illustrated in the scan setting confirmation screen Sc3 of FIG. 22, the "destination" as the setting item determined not to cause combination inhibition is changed from "Mr. A" illustrated in FIG. 21 to "Mr. B" as a change-instructed setting value.

Subsequently, in a manner similar to the process in the second embodiment, the setting order control unit 174 generates all of assumable setting order patterns as setting orders of a plurality of setting items included in the change instructions received by the instruction receiving unit 171. In each of the setting order patterns, the number of valid setting changes as the number of setting items in which the setting value can be changed to the change-instructed setting value is obtained on the basis of the setting order and, on the basis of the number of valid setting changes, a change order to the change-instructed setting value of the present setting value is set.

Since the "destination" of "2" in the change instructions received by the instruction receiving unit 171 has been already changed, the setting order control unit 174 generates a setting order pattern of "color" of "1" and "file format" of "3". Since the number of setting items is two, setting order patterns are two patterns of "3, 1" (pattern 1) and "1, 3" (pattern 2).

FIG. 23 is a diagram illustrating an example of a setting change result by the setting order control unit 174. In "pattern 1", the setting result is "O" in any of the setting items "3" and "1", and "the number of valid setting changes" is "2".

That is, even when "compact PDF" as the present setting value of "file format" of "3" is changed to "PDF" as the change-instructed setting value, no combination inhibition occurs between the setting items and its setting values instructed to be changed by voice and the setting values of the setting items which are presently set. Therefore, the setting result is "O".

Also in the case of changing "automatic" as the present setting value of "color" of "1" to "black" as the change-instructed setting value, no combination inhibition occurs between the setting items and its setting values instructed to be changed by voice and the setting values of the setting items which are presently set. Therefore, the setting result in this case is also "O".

On the other hand, in "pattern 2", when "color" of the setting item "1" is changed from "automatic" as the present setting value to "black" as the setting value instructed to be changed by the voice operation, combination inhibition occurs between "color: black" after the change and "file format: compact PDF" in the present setting. Therefore, the setting result becomes "x".

Also in the case of changing "file format" of the setting item "3" from "compact PDF" as the present setting value to "PDF" as the setting value instructed to be changed by the voice operation, no combination inhibition occurs between the setting values of the setting items instructed to be changed by the voice operation and the setting values of the present setting items. Therefore, the setting result is "O" and the number of valid setting changes in "pattern 2" becomes "1".

In this case, the setting order control unit 174 sets the changing order of the setting values to "3, 1" specified by "pattern 1" in which the number of valid setting changes is larger, and the setting changing unit 172 changes the setting values of the setting items in order of, first, "file format" of "3" and then "color" of "1".

The change result of the setting values changed by the setting changing unit 172 on the basis of the setting change result illustrated in FIG. 23 will be described. FIG. 24 is a diagram illustrating an example of the scan setting confirmation screen Sc3 displayed in the operation display unit 13 of the image forming device 1. By the process condition setting process according to the embodiment, as illustrated in FIG. 24, "destination" in the scan setting is set to "Mr. B" (no setting change), "color" is set to "black", "resolution" is set to "300 dpi", and "file format" is set to "PDF".

Procedure of Process Condition Setting Process by Image Processing System

Figure 25:
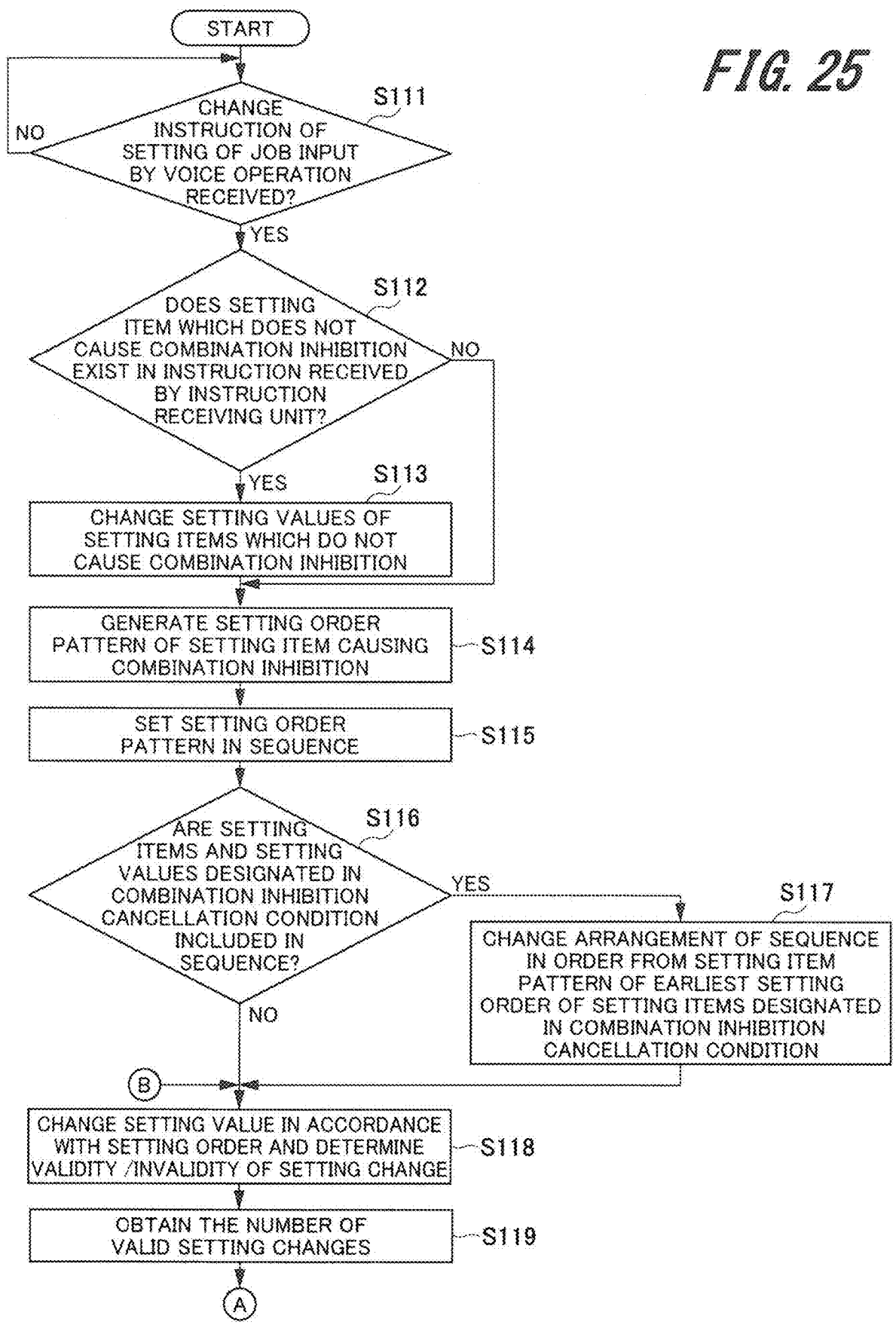
FIG. 25 is a flowchart illustrating an example of the procedure of a process condition setting process by an image processing system according to the third embodiment of the present invention.
Figure 26:
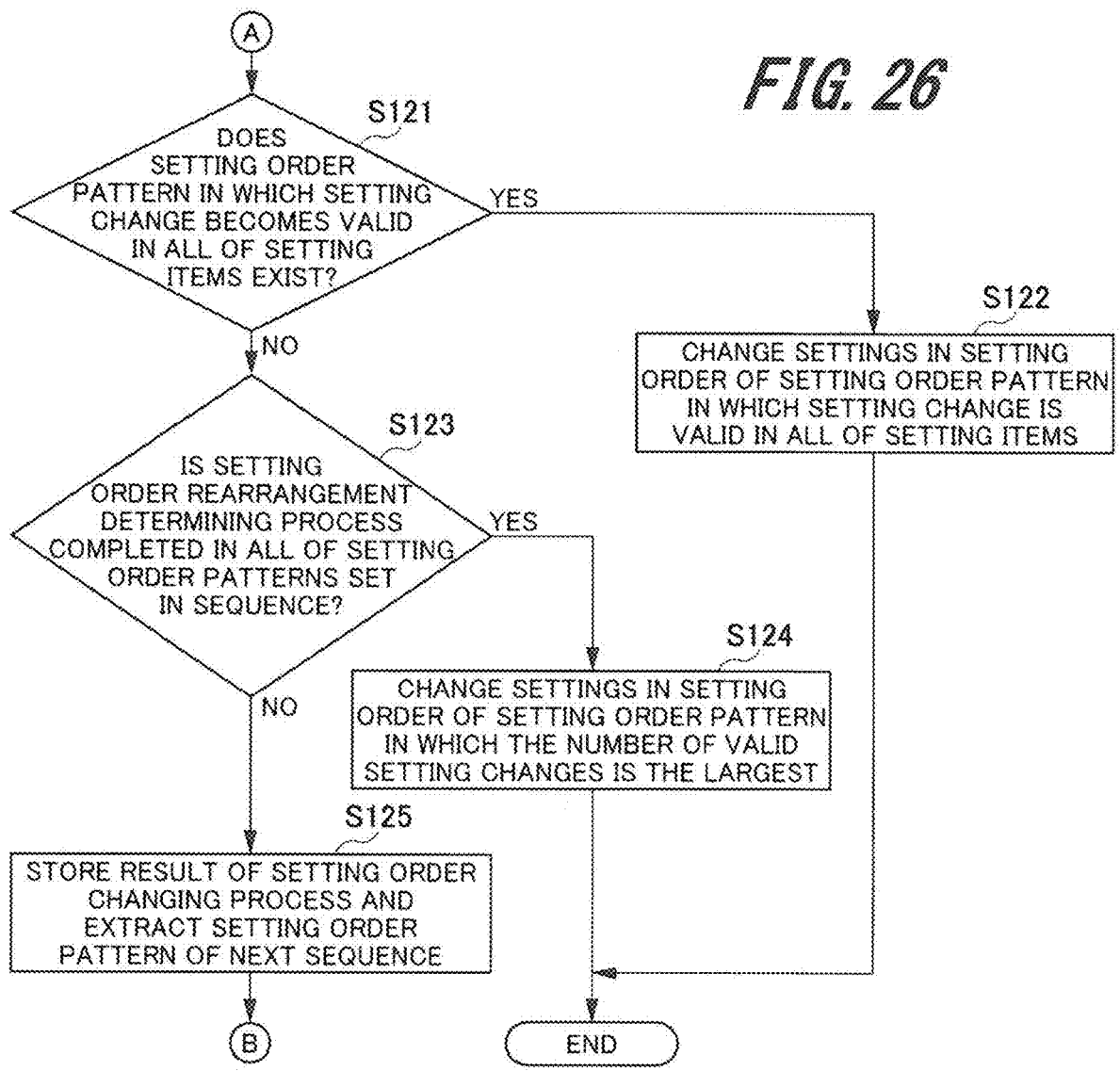
FIG. 26 is a flowchart illustrating an example of the procedure of the process condition setting process by the image processing system according to the third embodiment of the present invention.

Next, referring to FIG. 25, the procedure of a process condition setting process by the image processing system according to the third embodiment of the present invention will be described. FIGS. 25 and 26 are a flowchart illustrating an example of the procedure of a process condition setting process by the image processing system according to the third embodiment of the present invention.

First, the control unit 12 (refer to FIG. 2) of the image forming device 1 determines whether the instruction receiving unit 171 receives a job setting change instruction which is input from the user by voice operation or not (step S111). When it is determined in step S111 that a job setting change instruction is not received (the case of NO determination in step S111), the control unit 12 repeats the determination of step S111.

On the other hand, when it is determined in step S111 that a job setting change instruction is received (the case of YES determination in step S111), the setting order control unit 174 determines whether there is a setting item which does not cause combination inhibition in the instruction received by the instruction receiving unit 171 (step S112). When it is determined in step S112 that there is a setting item which does not cause combination inhibition (the case of YES determination in step S112), first, the setting changing unit 172 changes the setting value of the setting item which does not cause combination inhibition (step S113).

Subsequently, the setting order control unit 174 generates a setting order pattern of a setting item which causes combination inhibition (step S114). Also in the case where it is determined in step S112 that there is no setting item which does not cause combination inhibition (the case of NO determination in step S112), the process of step S114 is executed.

Subsequently, the setting order control unit 174 sets all of the generated setting order patterns in a sequence (step S115). The setting order control unit 174 determines whether a setting item and a setting value designated in "combination inhibition cancellation condition" in the combination inhibition setting table T1 are included in the setting order patterns which are set in the sequence (step S116).

In the example of the setting change result illustrated in FIG. 23, "file format: PDF" of "3", in "color: black" of the setting item "1" and "file format: PDF" of the setting item "3", is included in "combination inhibition cancellation condition" in the combination inhibition setting table T1. Therefore, the determination in step S116 becomes YES determination.

When it is determined in step S116 that the setting item and the setting value designated in "combination inhibition cancellation condition" are included (the case of YES determination in step S116), the setting order control unit 174 rearranges the sequence in descending order from a setting pattern of the earliest setting order of the setting item designated in the combination inhibition condition (step S117). In the example of the setting change result illustrated in FIG. 23, the setting order control unit 174 disposes the setting order pattern of "pattern 1" of the setting item of the earliest setting order (first) of "file format" of "3" designated in "combination inhibition cancellation condition" to the head of the sequence. After that, the setting order pattern of "pattern 2" is disposed.

After the process of step S117 or in the case of NO determination in step S116, the setting order control unit 174 extracts one setting order pattern which is set in the sequence, changes the setting values of the setting items in accordance with the setting order displayed in the setting order pattern, and checks whether the change of the setting is valid or invalid every setting item (step S118). Subsequently, the setting order control unit 174 calculates the number of setting items determined in step S118 that the change of the setting is valid, that is, the number of valid setting changes (step S119).

Since the processes in steps S121 to S125 in FIG. 26 coupled by the connector A after the process of step S119 are the same as those of steps S76 to S80 in FIG. 18, description will be omitted. After the process of step S125, that is, after the setting order control unit 174 stores the result of the process condition setting process and extracts a setting order pattern of the next sequence, the process of step S118 in FIG. 25 is performed.

According to the above-described third embodiment, in the case where a setting item which does not cause combination inhibition is included in setting change instructions received by the instruction receiving unit 171, the change of the setting value of the setting item is executed first by the setting changing unit 172. Therefore, the number of setting order patterns as an object of checking the validity or invalidity of the change of the setting value of the setting item, performed to calculate the number of valid setting changes decreases by the amount. Therefore, according to the modification, setting values of a plurality of setting items instructed to be changed by voice operation can be changed more swiftly.

Modification of Third Embodiment

Next, process condition setting by the image processing system 100 according to a modification of the third embodiment of the present invention will be described. In the modification, in the foregoing embodiments or their modifications, in the case where there is no setting order pattern in which change of setting values in all of setting items become valid but there are a plurality of setting order patterns in which the number of valid setting changes is the largest, the setting order control unit 174 determines the setting order on the basis of the score of the priority which is set in advance in each of the setting items.

It is assumed that a setting item and priority are associated in advance in the priority management table. FIG. 27 is a diagram illustrating a configuration example of a priority management table T2. As illustrated in FIG. 27, the priority management table T2 has items of "setting item" and "priority". A setting item is stored in the item of "setting item", and the score of priority at the time of setting change, which is set in the setting item is stored in the item of "priority".

In the example illustrated in FIG. 27, priority "3" is associated with "color" in the setting item, priority "2" is associated with "resolution", and priority "1" is associated with "file format". As the priority, for example, it is assumed that the user can set a proper value in accordance with the usage of printing or the like such as quality emphasis or running-cost emphasis.

The process condition setting process using the priority by the image processing system 100 according to the modification of the third embodiment will be described by using a concrete example. FIG. 28 is a diagram illustrating an example of the scan setting confirmation screen Sc3 displayed in the operation display unit 13 (refer to FIG. 2) of the image forming device 1.

In the scan setting confirmation screen Sc3 illustrated in FIG. 28, as setting contents at the present time point, "destination: none", "color: setting value v1", "resolution: setting value v2", and "file format: setting value v3" are displayed. It is assumed that the instruction receiving unit 171 receives the following three change instructions.

1. color: setting value vA
2. resolution: setting value vB
3. file format: setting value vC FIG. 29 is a diagram illustrating an example of setting change results by the setting order control unit 174. In the example illustrated in FIG. 29, the setting change result includes the items of "pattern", "setting order", "setting result", "the number of valid setting changes", and "total of priority". Since the meaning of the items of "pattern", "setting order", "setting result", and "the number of valid setting changes" is the same as that of the setting change result illustrated in FIG. 16, description will be omitted. In "total value of priority", the total value of priority associated with the setting item whose setting result is "O" is stored.

For example, in the setting order pattern of "pattern 1" in which the setting order is "1 (color), 2 (resolution), and 3 (file format)", the setting item whose setting result is "O" is "file format" of "3". Since the priority "1" is associated with "file format" of "3" in the priority setting table T2 illustrated in FIG. 27, the total value of priority in the setting order pattern of pattern 1 becomes "1".

In "pattern 2", the setting items whose setting result is "O" are "3" and "2" in the setting order pattern of the setting order "1, 3, 2". In the priority setting table T2 illustrated in FIG. 27, priority "1" is associated with "file format" of "3", and priority "2" is associated with "resolution" of "2". Therefore, the total value of priority in the setting order pattern of pattern 2 is "1"+"2"="3".

In the case where there are a plurality of setting order patterns in which the number of valid setting changes is the largest, the setting order control unit 174 sets the setting order of a present setting value to a setting order in a setting order pattern in which the score of the total value of priority is the highest. In the example illustrated in FIG. 29, the total value of priority in the setting order pattern of "pattern 6" is "5" which is the highest. Therefore, the setting order control unit 174 sets "3, 1, 2" as the setting order of "pattern 6" to the setting order in the case of changing the present setting value. The setting changing unit 172 changes the present set value to a change-instructed setting value which is instructed to be changed by voice operation in order of "3 (file format), 1 (color), 2 (resolution)".

Figure 30:
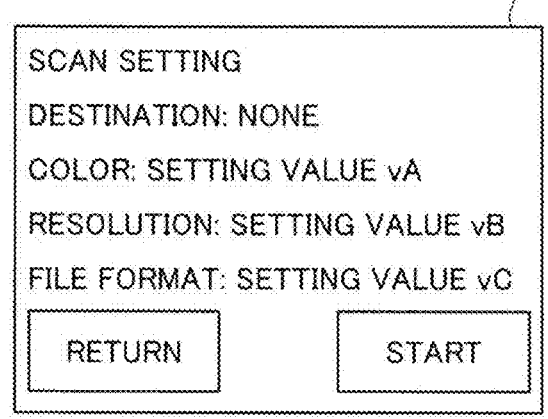
FIG. 30 is a diagram illustrating an example of a scan setting confirmation screen displayed in an operation display unit of the image forming device according to the modification of the third embodiment of the present invention.

A change result of a setting value which is changed by the setting changing unit 172 on the basis of the setting change result illustrated in FIG. 29 will be described. FIG. 30 is a diagram illustrating an example of the scan setting confirmation screen Sc3 displayed in the operation display unit 13 of the image forming device 1. By executing the process condition setting process according to the modification of the third embodiment, as illustrated in FIG. 30, in the scan setting, "destination" is set to "none" (no setting change), "color" is set from "setting value v1" before change to "setting value vA", "resolution" is set from "setting value v2" to "setting value vB", and "file format" is set from "setting value v3" to "setting value vC".

Procedure of Process Condition Setting Process by Image Processing System

Figure 31:
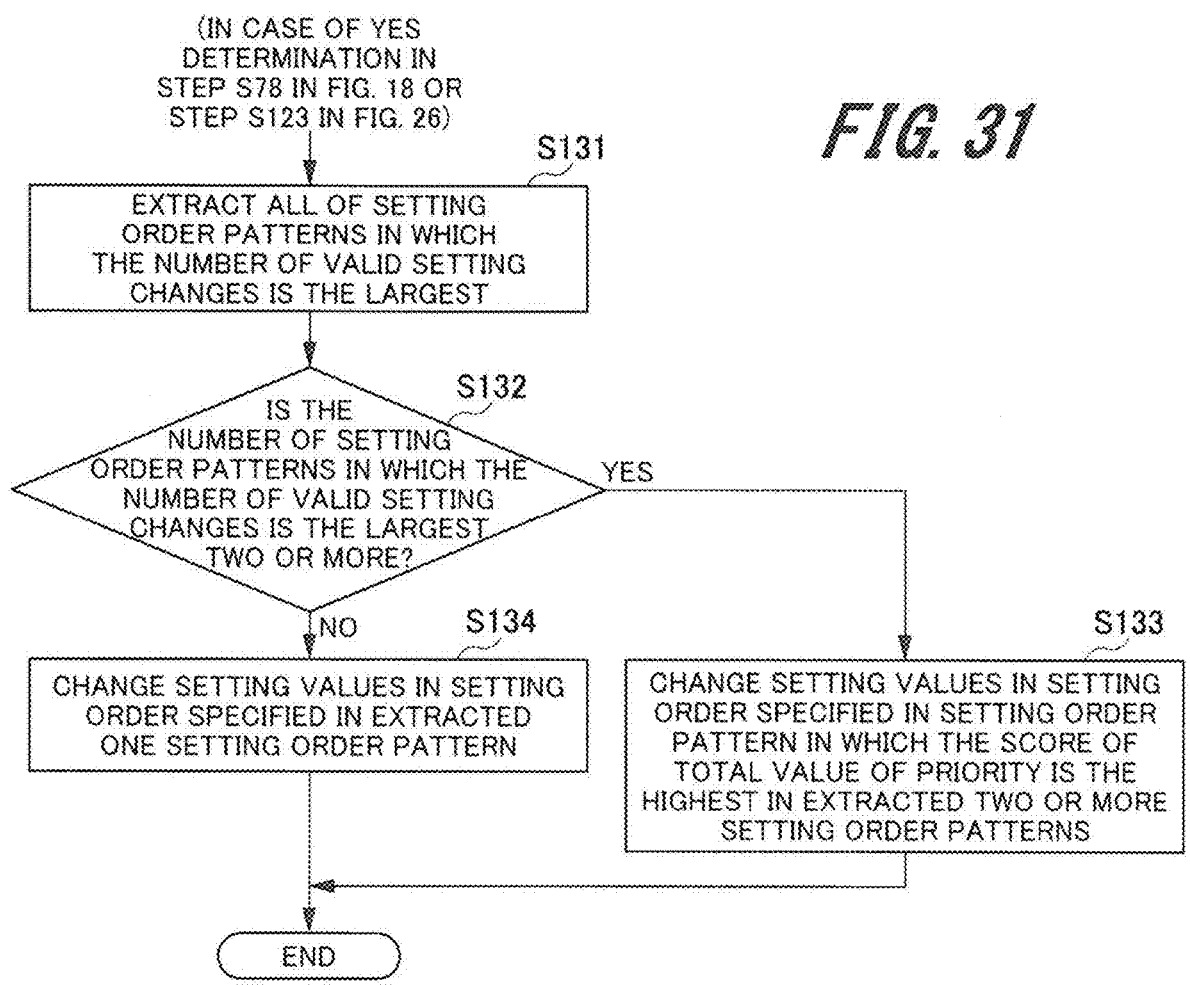
FIG. 31 is a flowchart illustrating an example of the procedure of a process condition setting process by an image processing system according to the modification of the third embodiment of the present invention.

Next, referring to FIG. 31, the procedure of a process condition setting process by the image processing system according to the modification of the third embodiment of the present invention will be described. FIG. 31 is a flowchart illustrating an example of the procedure of the process condition setting process by the image processing system according to the modification of the third embodiment of the present invention.

The processes illustrated in FIG. 31 are performed when YES is determined in step S78 in FIG. 18 or step S123 in FIG. 26. The case where YES is determined in step S78 in FIG. 18 or step S123 in FIG. 26 is the case where there is no pattern in which setting change becomes valid in all of setting items and the setting order rearrangement determining process is completed in all of setting order patterns set in the sequence.

In this case, the setting order control unit 174 extracts all of setting order patterns in which the number of valid setting changes is the largest (step S131). Subsequently, the setting order control unit 174 determines whether the number of setting order patterns in which the number of valid setting changes is the largest is two or larger (step S132). When it is determined in step S132 that the number of setting order patterns in which the number of valid setting changes is the largest is two or larger (the case of YES determination in step S132), the setting order control unit 174 changes the setting value in a setting order which is specified in a setting order pattern in which the score of a total value of priority is the highest among two or more setting order patterns extracted in step S131 (step S133).

On the other hand, when it is determined in step S132 that the number of setting order patterns in which the number of valid setting changes is the largest is not two or larger, that is, is equal to one (the case of NO determination in step S132), the setting order control unit 174 changes the setting value in the setting order specified in the setting order patterns extracted in step S131 (step S134). After the process of step S133 or S134, the control unit 12 finishes the process condition setting process.

According to the above-described modification of the third embodiment, even in the case where there are two or more setting order patterns in which the number of valid setting changes is the largest, a setting order is set on the basis of the score of the total value of priority which is associated with each of setting items. Therefore, according to the modification, setting values of a plurality of setting items instructed to be changed by voice operation can be changed more swiftly.

Various Modifications

The present invention is not limited to the foregoing embodiments. Without departing from the gist of the present invention described in the scope of the claims for a patent, other various application examples and modifications can be employed.

Although the example of sending a notification to the user such as "Scan is accepted. Do you change settings?" from the voice input/output device 2 has been described in the foregoing embodiments, the present invention is not limited to the example. A message to the user may be displayed by characters on the screen of the operation display unit 13.

Although the example where a smart speaker is used as the voice input/output device 2 has been described in the foregoing embodiments, the present invention is not limited to the example. As the voice input/output device 2, a portable terminal device such as a cellphone terminal or a smartphone may be used.

Further, although the examples of applying the process condition setting system to the image forming device or the image processing system including the image forming device have been described in the foregoing embodiments and modifications, the present invention is not limited to the embodiments. The process condition setting system of the present invention may be applied to a printer controller which does not perform image formation, a device such as a PC (Personal Computer), a system including any of the devices, and the like.

Although the embodiments and modifications of the present invention have been described and illustrated in detail, the disclosed embodiments and modifications are made for purposes of illustration and example only and not limitation. The scope of the present invention should be interpreted by terms of the appended claims.

DESCRIPTION OF REFERENCE NUMERALS

1, 1A image forming device
2 voice input/output device
3, 3A voice processing server
10 control unit
13 operation display unit
14 image reading unit
15 image processing unit
16 image forming unit
17 process condition setting unit
18 setting changing unit
31 control unit
34 process condition setting unit
100 image processing system
100A image processing system
171 instruction receiving unit
172 setting changing unit 173 combination inhibition determining unit
174 setting order control unit
313 storage unit
341 instruction receiving unit
342 combination inhibition determining unit
343 setting order control unit

What is claimed is:

1. A process condition setting system comprising:
an instruction receiving unit receiving a change instruction by a voice operation, for set setting values of a plurality of setting items;
a setting order control unit, in the case where combination inhibition occurs between a change-instructed setting value included in the change instruction and the set setting value when the set setting values of the plurality of setting items are changed in a setting order based on the change instruction, the unit changing the setting order of changing the set setting values to a setting order in which the combination inhibition does not occur; and
a setting changing unit changing the set setting values of the plurality of setting items in the changed setting order.

2. The process condition setting system according to claim 1, further comprising a combination inhibition determining unit determining whether the combination inhibition occurs or not by a change of the set setting value to the change-instructed setting value,
wherein the plurality of setting items include a first setting item and a second setting item in which priority higher than priority of the setting change that is set in the first setting item is set, and
the combination inhibition determining unit determines whether the combination inhibition occurs or not on the basis of a combination between the change-instructed setting value in the first setting item and the setting value of the second setting item.

3. The process condition setting system according to claim 2, wherein in the case where the combination inhibition does not occur in the combination between the setting value of the first setting item and the change-instructed setting value of the second setting item, the setting order control unit changes the priority of the change set in the first setting item to priority higher than the priority of the change set in the second setting item.

4. The process condition setting system according to claim 1, wherein the setting order control unit generates all of assumable setting order patterns as setting order patterns of the plurality of setting items included in the change instruction, determines validity or invalidity of a change of the set setting values to the change-instructed setting values on the basis of the setting orders of the setting order patterns and, on the basis of the result of the determination, changes a change order of the set setting values of the plurality of setting items to the change-instructed setting values.

5. The process condition setting system according to claim 4, wherein the case where a change of the set setting value to the change-instructed setting value is valid is the case where the change can be made without causing the combination inhibition, and the case where the change of the set setting value to the change-instructed setting value is invalid is the case where the change cannot be made due to occurrence of the combination inhibition.

6. The process condition setting system according to claim 5, wherein the setting order control unit obtains the number of valid setting changes as the number of setting items in which a change of the set setting value to the change-instructed setting value is valid in each of the setting order patterns and, in the case where the setting order pattern in which the number of valid setting changes is the same as the number of the plurality of setting items exists, changes the change order of the setting values of the plurality of setting items to the change-instructed set values in the setting order of the setting order pattern.

7. The process condition setting system according to claim 6, wherein in the case where the setting order pattern in which the number of valid setting changes is the same as the number of the plurality of setting items does not exist, the setting order control unit changes the change order of the setting values of the plurality of setting items to the change-instructed setting values in the setting order of the setting order pattern in which the number of valid setting changes is the largest among the setting order patterns.

8. The process condition setting system according to claim 7, further comprising a storage unit storing a priority management table in which the setting item and priority of a change of a setting value of the setting item are associated,
wherein in the case where the setting order pattern in which the number of valid setting changes is the same as the number of the plurality of setting items does not exit and in the case where a plurality of setting order patterns in which the number of valid setting changes is the largest exit in the setting order patterns, the setting order control unit changes the setting order of the change of the set setting value to the change-instructed setting value in a setting order specified in the setting order pattern in which the total value of the priority written in the priority management table is the highest.

9. The process condition setting system according to claim 4, further comprising a storage unit storing a combination inhibition setting table in which information of a combination of the setting item and a setting value causing the combination inhibition is written,
wherein when a combination is determined to exist which is not written in the combination inhibition table in combinations between the change-instructed setting values and the set setting values, the setting order control unit takes the combination off from objects of determination of validity/invalidity of a change to the change-instructed setting value of the set setting value.

10. The process condition setting system according to claim 9, wherein a combination inhibition condition indicated by a setting item and a setting value which can cancel the combination inhibition by a change to the setting value is written in the combination inhibition setting list and,
when the setting item and the setting value written in the combination inhibition cancellation condition are determined to be included in the change instruction received by the instruction receiving unit, the setting order control unit sets the order of determination of validity or invalidity of a change of the set setting value to the change-instructed setting value, to the head of the setting order pattern including the setting item and the setting value.

11. The process condition setting system according to claim 1, further comprising an image reading unit optically reading image data from an original placed on an original placing table,
wherein the setting item is a setting item related to a process of the image reading unit.

12. A process condition setting method comprising:

a procedure of receiving a change instruction by a voice operation, for set setting values of a plurality of setting items;

in the case where combination inhibition occurs between a change-instructed setting value included in the change instruction and a set setting value when the set setting values of the plurality of setting items are changed in a setting order based on the change instruction, a procedure of changing the setting order of changing the set setting values to a setting order in which the combination inhibition does not occur; and a procedure of changing the set setting values of the plurality of setting items in the changed setting order.

13. A non-transitory computer readable storage medium storing a program causing a computer to execute:

a procedure of receiving a change instruction by a voice operation, for set setting values of a plurality of setting items;

in the case where combination inhibition occurs between a change-instructed setting value included in the change instruction and the set setting value when the set setting values of the plurality of setting items are changed in a setting order based on the change instruction, a procedure of changing the setting order of changing the set setting values to a setting order in which the combination inhibition does not occur; and a procedure of changing the set setting values of the plurality of setting items in the changed setting order.

\* \* \* \* \*